US009624069B2

United States Patent
Hamaguchi et al.

(10) Patent No.: US 9,624,069 B2
(45) Date of Patent: Apr. 18, 2017

(54) OPTICAL FIBER WINDING REEL AND REEL-WOUND OPTICAL FIBER

(71) Applicant: FUJIKURA LTD., Tokyo (JP)

(72) Inventors: Hiroki Hamaguchi, Sakura (JP); Shunichirou Hirafune, Sakura (JP)

(73) Assignee: FUJIKURA LTD., Tokyo (JP)

( * ) Notice: Subject to any disclaimer, the term of this patent is extended or adjusted under 35 U.S.C. 154(b) by 151 days.

(21) Appl. No.: 14/600,669

(22) Filed: Jan. 20, 2015

(65) Prior Publication Data
US 2015/0203326 A1 Jul. 23, 2015

(30) Foreign Application Priority Data

Jan. 22, 2014 (JP) ................................. 2014-009668

(51) Int. Cl.
| B65H 75/14 | (2006.01) |
|---|---|
| B65H 75/28 | (2006.01) |
| G02B 6/44 | (2006.01) |

(52) U.S. Cl.
CPC ............. *B65H 75/14* (2013.01); *B65H 75/28* (2013.01); *G02B 6/4457* (2013.01); *B65H 2701/32* (2013.01)

(58) Field of Classification Search
CPC ......... B65H 75/14; B65H 75/28; B65H 75/44
See application file for complete search history.

(56) References Cited

U.S. PATENT DOCUMENTS

| 3,358,943 | A | * | 12/1967 | Pelson | B65H 75/28 242/118.7 |
|---|---|---|---|---|---|
| 4,387,863 | A | * | 6/1983 | Edmonston | B65H 75/14 242/118.4 |
| 4,696,438 | A | * | 9/1987 | Myers | B65H 55/00 242/118.41 |
| 6,047,918 | A | * | 4/2000 | Saito | B65H 75/14 242/125.2 |
| 6,533,216 | B1 | * | 3/2003 | Bumgarner | B65H 75/14 242/118.41 |

(Continued)

FOREIGN PATENT DOCUMENTS

| CN | 87107971 A | 8/1988 |
|---|---|---|
| CN | 1201915 A | 12/1998 |

(Continued)

OTHER PUBLICATIONS

Communication, Jun. 16, 2016, from the State Intellectual Property Office of the P.R.C., in counterpart Chinese application No. 201510029468.8.

*Primary Examiner* — Sang Kim
(74) *Attorney, Agent, or Firm* — Sughrue Mion, PLLC

(57) ABSTRACT

An optical fiber winding reel of the invention includes: a cylindrical main winding body; main flanges provided at both respective ends of the main winding body in an axis direction thereof; and an auxiliary winding body provided outside at least one of the main flanges, wherein a slit that extends toward a central axis line of a reel is formed at part in a circumferential direction of the main flange at which the auxiliary winding body is provided, and both side portions of a position of the main flange at which the slit is formed are a low rigidity region, the low rigidity region has a rigidity locally lower than that of the other portions in a direction orthogonal to a plate surface of the main flange.

10 Claims, 18 Drawing Sheets

(56) References Cited

U.S. PATENT DOCUMENTS 7,257,280 B1 * 8/2007 Karpati ................ G02B 6/4463
　　　　　　　　　　　　　　　　　　　　385/100

FOREIGN PATENT DOCUMENTS

| | | |
|---|---|---|
| CN | 201993501 U | 9/2011 |
| CN | 202351485 U | 7/2012 |
| DE | 20018151 U1 | 1/2001 |
| JP | 9-120010 A | 5/1997 |
| JP | 11-236171 A | 8/1999 |
| JP | 2000-247547 A | 9/2000 |
| JP | 2001-322767 A | 11/2001 |
| JP | 2009-178051 A | 8/2009 |

* cited by examiner

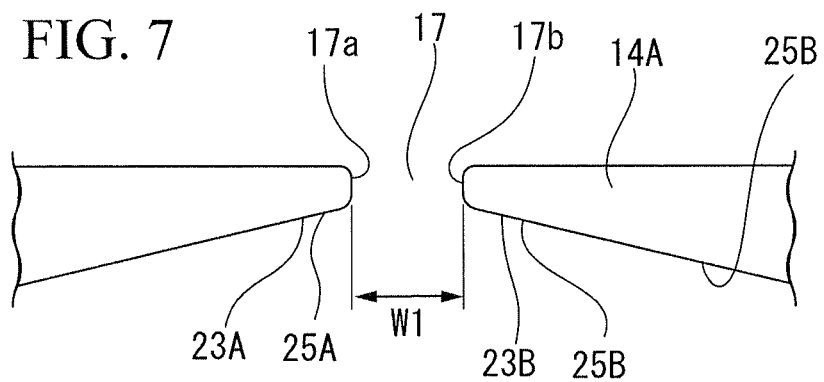
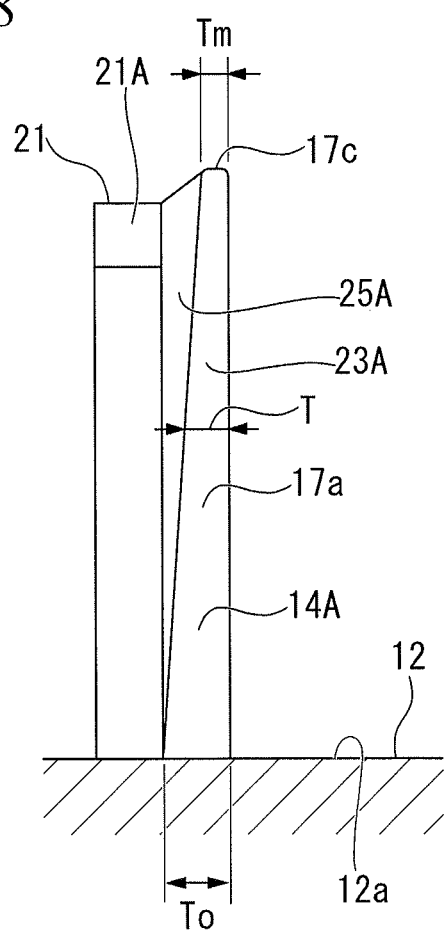

OPTICAL FIBER WINDING REEL AND REEL-WOUND OPTICAL FIBER

CROSS-REFERENCE TO RELATED APPLICATION

This application is based on and claims priority from Japanese Patent Application No. 2014-009668 filed on Jan. 22, 2014, the contents of which are incorporated herein by reference in their entirety.

BACKGROUND OF THE INVENTION

Field of the Invention

The present invention relates to an optical fiber winding reel used to wind up an optical fiber such as an optical fiber for communication and relates to an optical fiber in a state being wound around the optical fiber winding reel, that is, a reel-wound optical fiber.

Description of the Related Art

As a reel (bobbin) used to wind up an optical fiber, a reel having flanges that are provided at both ends of a cylindrical winding body (main winding body which will be described later) is generally used.

Additionally, when shipping fiber products, generally, optical fiber products are shipped in a state where an optical fiber is wound around a reel, that is, in a configuration in which an optical fiber is wound around a reel.

However, for an optical fiber for communication, various measurements or inspection such as measurement of transmission loss for quality guarantee or the like are generally carried out in a state where the fiber is wound around a reel.

For this reason, regarding an optical fiber that has a long length and is in a state of being wound around a reel, it is necessary for both ends of the optical fiber to be exposed such that a length of the exposed portion is, for example, several meters to ten several meters.

Here, since the end portion (end edge) of the winding ended portion of the reel-wound optical fiber is located at the outermost layer of the winding body of the reel, the end portion can be easily exposed thereat.

However, in the case where the winding start portion (start end) of the optical fiber is simply wound around the winding body, the winding start portion is located at the innermost layer of the wound layers provided on the winding body on which the optical fiber is stacked and wound, and the winding start portion is buried in the wound layers.

Consequently, as a conventional optical fiber winding reel 10, as shown in FIG. 18 as an example, a reel 10 is known in which an auxiliary winding body 16 is provided on the outer side of the main flange 14A that is one (winding start side) of main flanges 14A and 14B located on both sides of a winding body 12 (main winding body), and a hole 18 that penetrates through both the inner face and the outer face of the main flange 14A is formed at the position of the main flange 14A which corresponds to the position near the outer peripheral face of the main winding body 12 (for example, refer to Japanese Unexamined Patent Application, First Publication No. 2001-322767).

When an optical fiber is wound using the reel 10 shown in FIG. 18, the winding start terminal of the optical fiber is inserted into the hole 18 of the main flange 14A from the inner face of the main flange 14A (surface near the main winding body 12), and the winding start terminal is drawn toward the outer face of the main flange 14A.

Furthermore, the optical fiber is drawn through the hole 18 of the main flange 14A so as to obtain a certain length thereof, the optical fiber is wound around the auxiliary winding body 16, and thereafter the optical fiber is wound around the main winding body 12.

However, in the case of using the reel 10 shown in FIG. 18, a user must manually carry out the operations (manual-handling task) of causing an optical fiber as fine as a hair to pass through a small hole 18, obtaining a certain length of the optical fiber by drawing the optical fiber, and winding the drawn fiber by the above-described manner around the auxiliary winding body 16.

Because of this, it has been extremely difficult for an initial operation of winding an optical fiber around the reel 10 to be mechanized or automated.

Consequently, it is difficult for the above-described winding operation to be carried out by total automation, and there is also a limit in promotion of streamlining the operation and reduction in cost.

On the other hand, as shown in FIG. 19, a reel 10 on which a slit 17 is formed on a main flange 14A located at the winding start end side thereof has conventionally used (for example, refer to Japanese Unexamined Patent Application, First Publication No. H9-120010, Japanese Unexamined Patent Application, First Publication No. H11-236171, or the like). The slit extends from the outer circumferential edge of the main flange 14A toward the inside thereof in the diametrical direction of the main flange 14A so as to reach a position on the outer peripheral face of the main winding body 12.

In the case of using the reel 10 shown in FIG. 19, firstly, a portion that is located at the winding start side of an optical fiber is wound around the auxiliary winding body 16, thereafter, the optical fiber passes through the slit 17 from the auxiliary winding body 16 and is introduced into the main winding body 12, and the optical fiber can be wound around the main winding body 12.

According to the above-described method, in an initial step of a winding start process, when the optical fiber is introduced into the main winding body 12 from the auxiliary winding body 16, it is only necessary to put the optical fiber into the inside of the slit 17 from the outside of the main flange 14A, the winding operation can be easily mechanized or automated.

For this reason, in order to optimize the winding operation step and realize total automation therefor, unlike the reel 10 shown in FIG. 18 is used, it is preferable to use the reel 10 having the main flange 14A shown in FIG. 19 on which the slit 17 is formed.

However, regarding the reel 10 having the main flange 14A shown in FIG. 19 on which the slit 17 is formed, there are problems as follows.

Particularly, in the reel having the slit 17 that extends in the diametrical direction of the main flange 14A so as to reach a position on the outer peripheral face of the main winding body 12, there is a problem in that the degree of strength or the degree of rigidity of the main flange 14A inevitably becomes lower than that in the case where the slit 17 is not formed.

Specifically, in the case of handling a product around which an optical fiber is wound (reel-wound optical fiber), in many cases, a user picks up the reel with their fingers of one hand, an optical fiber is loaded on a feeding device or a winding device such as various measurement devices, the optical fiber is removed from the aforementioned devices, or a product around which the optical fiber is wound is portably carried.

In this case, there is a significant problem in that the degree of rigidity of the main flange 14A becomes lower as a result of forming a slit to the main flange 14A.

This problem will be described in detail with reference to FIGS. 20 to 22.

For convenience of explanation and preparation of drawings, the reel 10 is shown in FIGS. 20 to 22 so that right and left positions shown in FIG. 19 are reversed, and a right main flange is represented by reference numeral 14A.

As shown in FIG. 20, in the case where the user picks up the reel 10 with their hand 30, in many cases, the user inserts a finger other than their the thumb 31 (for example, the index finger 32 and the middle finger 33) into a shaft hole 11 that opens at the center portion of the end face of the reel 10 (the hole is a portion that is used such that a rotation shaft of a winding device used to wind an optical fiber or a rotation shaft of a feeding device used to an optical fiber is inserted thereinto), the user puts their thumb 31 on the outer circumferential edge portion of the main flange 14A, and the reel 10 is picked by the user.

In addition, a rotation shaft of a feeding device or a winding device such as various measurement devices generally extends in a horizontal direction.

Because of this, when the reel 10 is loaded into the above-mentioned devices or when the reel 10 is removed from the above-mentioned devices, generally, it is necessary to hold the reel 10 so that the central axis line O of the reel is maintained in a horizontal position.

At this time, the point P (the position on the outer circumferential edge portion of the main flange 14A) on which the user puts their thumb 31 is separated from the position of the center of gravity G of the reel in the lateral direction thereof and is located at a position upwardly separated from the horizontal axis line O passing through the position of the center of gravity G.

Accordingly, as indicated by an arrow F, a force is applied to the point P in a direction perpendicular to a flange plate surface.

That is, the force F (force that causes the main flange to be bent outward) that causes the main flange 14A to be deformed outward is applied to the point P.

On the other hand, since the slit 17 is formed on the main flange 14A, at the position at which the slit 17 is provided, the continuity of the shape of the main flange 14A in the circumferential direction thereof is absent.

Therefore, the degree of strength or rigidity of the position near the slit 17 which resists against a force in a direction perpendicular to the flange plate surface is low.

Furthermore, in the case where the position P on which the user puts the aforementioned thumb is located close to the slit 17, there is a concern that the flange plate of the main flange 14A is deformed at the portion including the position P on which the user puts their thumb.

Particularly, as shown in FIGS. 21 and 22, the flange plate of the main flange 14A is bent outward at the portion including the position P on which the user puts their thumb (retroflexion).

In this case, a space S occurs near the slit 17 and between the surface 40a of the optical fiber layers 40 that are wound around the main winding body and the inner surface 14Aa of the main flange 14A.

Subsequently, since a winding tension is applied to the optical fiber when the optical fiber is wound around the reel, if the width of the space S is large, the optical fiber forming the optical fiber layers 40 is dropped into the space S, and the winding shape is deformed.

That is, since the winding tension includes a component of a force directed to the radial-inner direction of the flange plate, a force directed in the radial-inner direction of the flange plate is always applied to the optical fiber forming the optical fiber layers 40 in the reel-wound optical fiber.

Consequently, if a large space S occurs at the surface 40a of the optical fiber layers 40, the optical fiber is dropped into the space S by the above-mentioned force directed in the radial-inner direction of the flange plate.

Accordingly, an alignment state of the optical fiber layers 40 is deformed due to the above-described dropping of the optical fiber into the space S, and the winding shape is thereby deformed.

In the case where the above-described deformation of the winding shape occurs, it is difficult to smoothly draw the wound optical fiber. Furthermore, a lateral pressure is applied to the optical fiber by the deformation of the winding shape, a transmission loss occurs in the reel-wound optical fiber, and there is also a concern that characteristics of the optical fiber cannot be accurately measured in a state where the optical fiber is wound around the reel.

Therefore, as a result of making the degree of rigidity of the flange plate higher in advance by increasing the thickness of the main flange 14A, an occurrence of warpage of the flange plate near the slit 17 is prevented and the space S is not formed even in the case where the user holds the reel near the slit 17 as mentioned above. Because of this, it is possible to prevent the optical fiber from dropping into the space in the case where the user holds one side of the reel with their fingers in the above-described manner.

However, in the case of attempting to reliably prevent the flange plate from being bent near the slit, the thickness of the flange plate must be significantly thicker.

In this case, the weight of the reel increases, the handling ability of the reel is deteriorated, and furthermore, there is a problem in that the cost of the material used to form a reel increases.

Accordingly, it is desirable to prevent an occurrence of dropping of the optical fiber into the space S, which is due to bending of the flange plate when the user holds the reel as mentioned above, without an increase in a thickness of the flange plate.

SUMMARY OF THE INVENTION

The invention was made in view of the above-described situation, and has an object to provide a reel that is provided with a main flange on which a slit is formed to guide an optical fiber into the reel from an auxiliary winding body, that prevents the optical fiber from dropping into the space by bending deformation of the flange plate near the slit when the user holds the reel with their fingers, and that does not increase a thickness of the flange plate. The invention also has an object to provide a reel-wound optical fiber which is obtained by winding an optical fiber around the reel.

In order to find a solution to solve the above-mentioned problem, the inventors have particularly observed and studied a situation in which the optical fiber is dropped into the space when a flange plate of a reel having a slit formed thereon is bent outward.

As a result, the inventors focused that, warpage of the flange plate occurs in a wide area, and the optical fiber easily drops into the space in the case where a space generation region expands at a large angle in the circumferential direction of the reel.

Particularly, in the case where the width of the space S is smaller than the outer diameter of the optical fiber, even if the space S occurs due to warpage of the flange plate, the optical fiber does not drop into the space.

In contrast, in the case where the width of the space S is larger than the outer diameter of the optical fiber, the optical fiber easily drops into the space.

In many cases, an outer diameter of a generally and widely used optical fiber such as an optical fiber for communication is 0.25 mm.

In this case, it is apparent that, in the case where the space S which occurs due to the warpage of the flange plate and is between the position of the side surface of wound layers formed by an optical fiber and the inner surface of the flange plate is larger than or equal to 0.25 mm, due to a tension generated in the optical fiber, the optical fiber located at the outer layer is easily dropped into the space S toward the inner layer.

Furthermore, the inventors have earnestly researched and carried out experiments, as a result, it was found that the degree of ease in which the optical fiber drops into the space S is not determined only by the above-mentioned width of the space S.

It was understood that the degree of ease in which the optical fiber drops into the space significantly depends on the range (angle range or length range) in which the space generation region spreads in the outer circumferential direction of the flange plate, that is, it was understood that the degree significantly depends on the angle range with respect to the central axis line of the reel in which a large space is generated or depends on the length in the circumferential direction of the flange plate.

Particularly, even in the case where a large space S of, for example, 0.25 mm or more, such that the space is larger than the outer diameter of the optical fiber, is generated, if a region in which the space S is generated is narrow (for example, an angle range of the space generation region with respect to the central axis line O of the reel is small), it was found that it is difficult for the optical fiber to drop into the space.

Adversely, in the case where a region having a large space of, for example, 0.25 mm or more, such that the space is larger than the outer diameter of the optical fiber, is generated so as to have a large angle in the circumferential direction of the flange plate, it was found that, the tension of the fiber that is generated in the circumferential direction thereof includes a force component that is directed in the radial-inner direction of the flange plate, and the optical fiber easily drops into the space toward the inner layer by the force component included in the fiber tension.

Based on the above-described knowledge, the inventors thought that, as a result of narrowing the region having the range in which the space is generated when the flange plate is bent outward, in other words, as a result of reducing the angle or the length of the space generation region with respect to the circumferential direction of the flange plate, it is difficult for the optical fiber to drop into the space even in the case where the flange plate is bent outward.

For this reason, the inventors thought that, as a result of reducing a degree of spreading of bending of the flange plate in the circumferential direction thereof when the user holds one side of the reel with their fingers, it is possible to effectively prevent the optical fiber from dropping into the space.

On the other hand, when the user puts their thumb on the position near the slit, holds one side of the reel with their fingers, and thereby holds the reel, the bending deformation occurs near the slit of the flange plate. Since the degree of rigidity of the flange plate near the slit is low as a result of providing the slit to the flange plate as described above, the above bending deformation occurs.

Accordingly, based on the aforementioned studies, the inventors thought that, as a result of causing the degree of rigidity of the flange plate within the narrow range of the region located close to the slit to be locally lower than those of the other portions of the flange plate, it is possible to limit the region in which warpage of the flange plate near the slit occurs to be in a narrow range.

Furthermore, the inventors have practically carried out repeated experiments, as a result of that, it was found that, by only making the degree of rigidity of a narrow range of the flange plate which is located close to the slit lower than those of the other portions of flange plate, the range of the outward-bending region of the flange plate when the user holds one side of the reel with their fingers in the above-described manner can be limited and reduced. Additionally, according to this, the inventors found that the range can be narrow in which a large space of, for example, 0.25 mm or more, such that the space is larger than the outer diameter of the optical fiber, is generated; moreover, the inventors found that it is possible to effectively prevent the optical fiber from dropping into the space, and finally, conceived of the invention.

An optical fiber winding reel according to a first aspect of the invention includes: a cylindrical main winding body; main flanges provided at both respective ends of the main winding body in an axis direction thereof; and an auxiliary winding body provided outside at least one of the main flanges, wherein a slit that extends toward a central axis line of a reel is formed at part in a circumferential direction of the main flange at which the auxiliary winding body is provided, and both side portions of a position of the main flange at which the slit is formed are a low rigidity region, the low rigidity region has a rigidity locally lower than that of the other portions in a direction orthogonal to a plate surface of the main flange.

In the above-described optical fiber winding reel according to the first aspect, the region of the main flange which is located on both sides of the slit only functions as a region (low rigidity region) having the degree of rigidity that is locally lower than that of the portion far from the slit of the main flange.

Consequently, when the user puts their finger on the position located near the slit (low rigidity region) at the time of holding the reel, the low rigidity region is bent easier than the portion which is far from the slit of the main flange (high rigidity region).

Because of this, in this case, a relatively-large space, that is, a space having a large width (for example, 0.25 mm or more) which is larger than the outer diameter of the optical fiber may be generated at the position near the slit and between the inner surface of the main flange and the side surfaces of the optical fiber layers that are wound around the main winding body.

However, as a result of forming the low rigidity region at a local position so that the formed range of the low rigidity region is in a narrow range, the region in which the space is generated and has a width larger than the outer diameter of the optical fiber can be narrower than the case where the foregoing low rigidity region is not formed near the slit.

In this case, it becomes difficult for the optical fiber constituting the optical fiber layers that are wound around the main winding body to drop into the space.

Accordingly, it is possible to prevent the winding shape from being deformed by dropping of the optical fiber into the space, and it is possible to prevent an increase in the transmission loss of the optical fiber in the optical fiber layers by applying a lateral pressure thereto.

Moreover, in the optical fiber winding reel according to a second aspect of the invention which is based on the optical fiber winding reel according to the first aspect, the low rigidity region may be formed so as not to reach a position of an outer peripheral face of the main winding body.

In a commonly-used optical fiber winding reel, in the case where an external force is applied to the main flange when the optical fiber winding reel is portably carried or the like, stress concentration is often generated at a base portion of the main flange (a portion at which the main winding body is continuously formed at the main flange).

For this reason, if the strength of the base portion of the main flange is low, there is a concern that cracking or breakage occurs at the base portion.

According to the optical fiber winding reel of second aspect, even at the position of the main flange near the slit, the degree of rigidity or strength of the base portion of the main flange (a portion at which the main winding body is continuously formed at the main flange) does not become particularly low.

As a result, it is possible to effectively prevent cracking or breakage from being generated at the base portion due to insufficiency of strength of the base portion of the main flange.

Moreover, in the optical fiber winding reel according to a third aspect of the invention which is based on the optical fiber winding reel according to any of the first and second aspects, the width of the low rigidity region in the circumferential direction of the main flange may be gradually smaller in a direction from an outer circumferential edge of the main flange toward a position of an outer peripheral face of the main winding body.

According to the above-described optical fiber winding reel of the above-described third aspect, a width of the low rigidity region in the circumferential direction of the main flange becomes smaller in a direction from the outer circumferential edge of the main flange to the outer peripheral face of the main winding body.

For this reason, even at the position of the main flange near the slit, the degree of strength of the base portion of the main flange (a portion at which the main winding body is continuously formed at the main flange) is ensured to be high, and it is possible to effectively prevent cracking or breakage from being generated at the base portion due to stress concentration in the base portion of the main flange and insufficiency of strength of the base portion.

Moreover, in the optical fiber winding reel according to a forth aspect of the invention which is based on the optical fiber winding reel according to any of the first to third aspects, the low rigidity region is formed in a range in the circumferential direction of the main flange, the range is located on a position of an outer-periphery of the main flange, the range includes both sides of the slit, the range is defined as an angle range with reference to a central axis line of the reel, and one-half of the range may be in 30 degrees or less.

According to the above-described optical fiber winding reel of the fourth aspect, the low rigidity region of the main flange, that is, the region which is easily bent when the user puts their finger on the region, is limited to a narrow range such that one-half of the range including both sides of the slit is in 30 degrees or less.

If in this range, the space generation region having a width that becomes larger than the outer diameter of the optical fiber due to warpage of the flange is in extremely narrow range such that one side thereof is less than or equal to approximately 20 degrees in a state where an optical fiber is fully wound around a widely-used optical fiber winding reel. Therefore, it is possible to effectively prevent the optical fiber from dropping into the space.

Particularly, it is preferable that the aforementioned low rigidity region be determined such that one-half of the range including both sides of the slit with respect to the central axis line of the reel is in 22.5 degrees or less.

In this case, the space generation region having a width that becomes larger than the outer diameter of the optical fiber due to warpage of the flange is in a narrower range such that one side thereof is less than or equal to approximately 15 degrees. Therefore, it is possible to more reliably prevent the optical fiber from dropping into the space.

Moreover, in the optical fiber winding reel according to a fifth aspect of the invention which is based on the optical fiber winding reel according to any of the first to fourth aspects, the low rigidity region may be formed by locally reducing a thickness of a portion of the main flange, which is located on the both sides of the position at which the slit is formed, so that the thickness thereof becomes thinner than that of the other portion.

The degree of rigidity of the main flange (the degree of rigidity in the direction orthogonal to the plate surface of the main flange) corresponds to the thickness of the main flange.

Accordingly, as a result of locally reducing the thickness of the main flange located at both side portions of the slit so that the thickness thereof becomes thinner than that of the other portion, the portion having a small thickness can be the low rigidity region.

As stated above, in the case of locally reducing the thickness of the main flange located at both side portions of the slit and thereby forming the portion having a small thickness as the low rigidity region, it is possible to easily produce a reel having the low rigidity region.

For example, in the case of resin-molding a reel, only by preliminarily designing a die so that the thickness of the main flange located close to the slit becomes thin, it is possible to easily manufacture a reel having a low rigidity region that is locally provided close to the slit.

Furthermore, even in the case of using an existing reel having a slit provided thereon, as a result of cutting only portions (portions located on both sides of the slit) of the reel by machining or the like, a reel having a local low rigidity region that is provided on both side portions located at the slit can be easily obtained.

Consequently, in the case where the invention is practically adopted in the reel, an increase in the cost of manufacturing the optical fiber winding reel can be minimized.

Moreover, in the optical fiber winding reel according to a sixth aspect of the invention which is based on the optical fiber winding reel according to the fifth aspect, the thickness of the low rigidity region of the main flange gradually may become smaller in a direction from the position close to the main winding body to a position of an outer circumferential edge of the main flange.

According to the above-described optical fiber winding reel of the sixth aspect, the degree of rigidity of the low rigidity region of the main flange which is located on both sides of the slit gradually becomes lower in a direction from the portion close to the main winding body to the outer circumferential edge of the main flange.

For this reason, when the user puts their finger on the outer circumferential edge portion of the main flange located adjacent to the slit, the portion close to the outer-peripheral end of the main flange is easily bent; on the other hand, a range of the region becomes narrower in which an air space occurs such as larger than or equal to the outer diameter of the optical fiber by bending outward.

As a result, it is possible to further reliably prevent the optical fiber from dropping into the space as described above.

Moreover, in the optical fiber winding reel according to a seventh aspect of the invention which is based on the optical fiber winding reel according to the fifth aspect, the thickness of the low rigidity region of the main flange may gradually become smaller in a direction from the position that is apart from the slit in an outer circumferential direction of the main flange to the position of the slit.

In the optical fiber winding reel of the seventh aspect, the degree of rigidity of the low rigidity region of the main flange which is located on both sides of the slit becomes lower in a direction from the position apart from the slit in the outer circumferential direction of the main flange to the position of the slit.

For this reason, when the user puts their finger on the outer circumferential edge portion of the main flange located adjacent to the slit, the portion close to the slit is easily bent.

Consequently, a range of the region becomes narrower in which an air space occurs such as larger than or equal to the outer diameter of the optical fiber by bending outward. As a result, it is possible to further reliably prevent the optical fiber from dropping into the space as described above.

Moreover, in the optical fiber winding reel according to an eighth aspect of the invention which is based on the optical fiber winding reel according to the fifth aspect, the thickness of the low rigidity region of the main flange may be uniform.

In the case where the thickness of the main flange located at the low rigidity region is uniform as stated above, the degree of rigidity of the inside of the low rigidity region becomes entirely uniform.

Even in this case, as a result of forming the low rigidity region at a local position having a uniform thin thickness in a narrow range as described in the first aspect, the formation range of the space generation region having a width larger than the outer diameter of the optical fiber can be narrower than that in the case of not forming the low rigidity region to be close to the slit.

In this case, it is difficult for the optical fiber constituting the optical fiber layers that are wound around the main winding body to drop into the space. Therefore, it is possible to prevent the winding shape from being deformed by dropping of the optical fiber into the space, and it is possible to prevent an increase in a transmission loss of the optical fiber in the optical fiber layers by applying a lateral pressure thereto.

Moreover, in the optical fiber winding reel according to a ninth aspect of the invention which is based on the optical fiber winding reel according to any of the first to eighth aspects, in the case of seeing a slit-formed portion of the main flange in a direction from one side of the plate surface of the main flange along a direction parallel to a rotation center of the reel, the slit may be formed so that one of edge portions that are located on both sides of the slit in the circumferential direction of the main flange does not overlap the other of the edge portions.

For example, the low rigidity region of one of the edge portions may be bent outward when the user puts their finger on the outer circumferential edge of the flange which is located close to one of the edge portions that are located on both sides of the slit in the circumferential direction of the main flange as described above. In the optical fiber winding reel of the ninth aspect, even in the above case where the low rigidity region of one of the edge portions is bent outward, it is possible to prevent the said one of the edge portions from being in contact with the other of the edge portions, and it is possible to prevent the low rigidity region including the other of the edge portions from being bent outward.

Consequently, a region in which a space having a width larger than the outer diameter of the optical fiber is generated can be formed so as to be limited to one side next to the slit, the space generation region having a width larger than the outer diameter of the optical fiber is thereby reliably narrow, and it is possible to reliably prevent the optical fiber from dropping into the space.

Furthermore, a reel-wound optical fiber according to a tenth aspect of the invention is configured to be wound around the main winding body of the optical fiber winding reel according to the first to ninth aspects.

The reel-wound optical fiber according to the tenth aspect can provide the above-described effects and functions in the first to ninth aspects to an optical fiber that is to be shipped as a product.

Effects of the Invention

According to the above-described aspects of the invention, in the optical fiber winding reel having the slit that is used to guide an optical fiber from the auxiliary winding body to the reel and is formed at the main flange, when the user puts their finger on the position near the slit provided on the outer circumferential edge of the main flange and thereby holds the reel with their fingers, without an increase in a thickness of the flange plate of the main flange, that is, without an increase in the weight of the reel, a region can be limited to be narrow, in which a space is generated between the optical fiber wound layers and the inner surface of the flange plate as a result of deformation (retroflexion, warpage) of the flange plate that occurs near the slit.

Particularly, a region, in which a large space is generated such as larger than or equal to the outer diameter of the optical fiber, can be limited to be narrow.

As a result, when a user holds the reel with their fingers, it is possible to avoid the optical fiber from dropping into the space. Therefore, it is possible to prevent the winding shape from being deformed by dropping of the optical fiber.

Consequently, since the deformation of the winding shape is not generated, the optical fiber can be smoothly drawn from the optical fiber wound layers, and it is possible to prevent an increase in a transmission loss which is caused by applying a lateral pressure thereto by the collapse of the winding shape.

Furthermore, an occurrence of other various problems by the deformation of the winding shape such that the optical fiber is deformed or damaged can be prevented.

BRIEF DESCRIPTION OF THE DRAWINGS

FIG. 7 is a horizontal cross-sectional view taken along the line VII-VII shown in FIG. 6.

FIG. 8 is a vertical cross-sectional view taken along the line VIII-VIII shown in FIG. 6.

DETAILED DESCRIPTION OF THE INVENTION

Hereinafter, an embodiment of the invention will be described in detail with reference to drawings.

Figure 1:
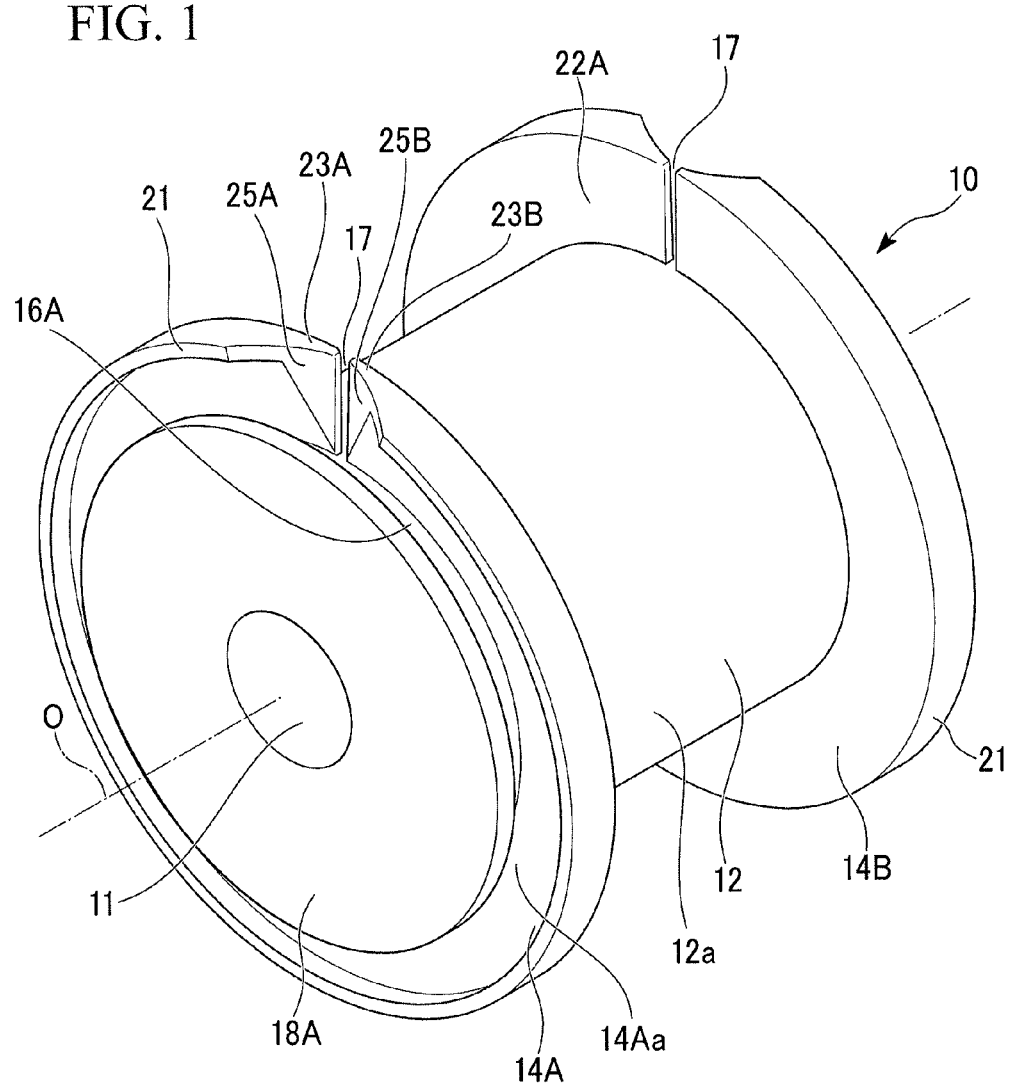
FIG. 1 is a perspective view showing an optical fiber winding reel according to a first embodiment of the invention.
Figure 2:
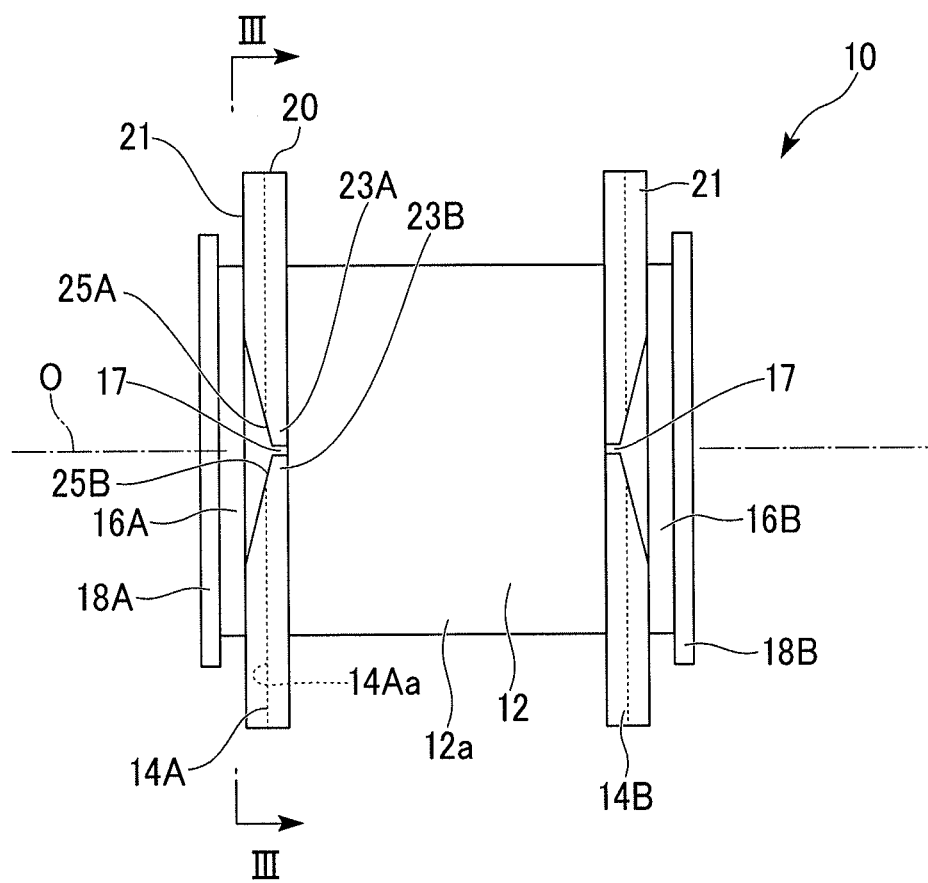
FIG. 2 is a plan view showing the optical fiber winding reel according to the first embodiment shown in FIG. 1.
Figure 3:
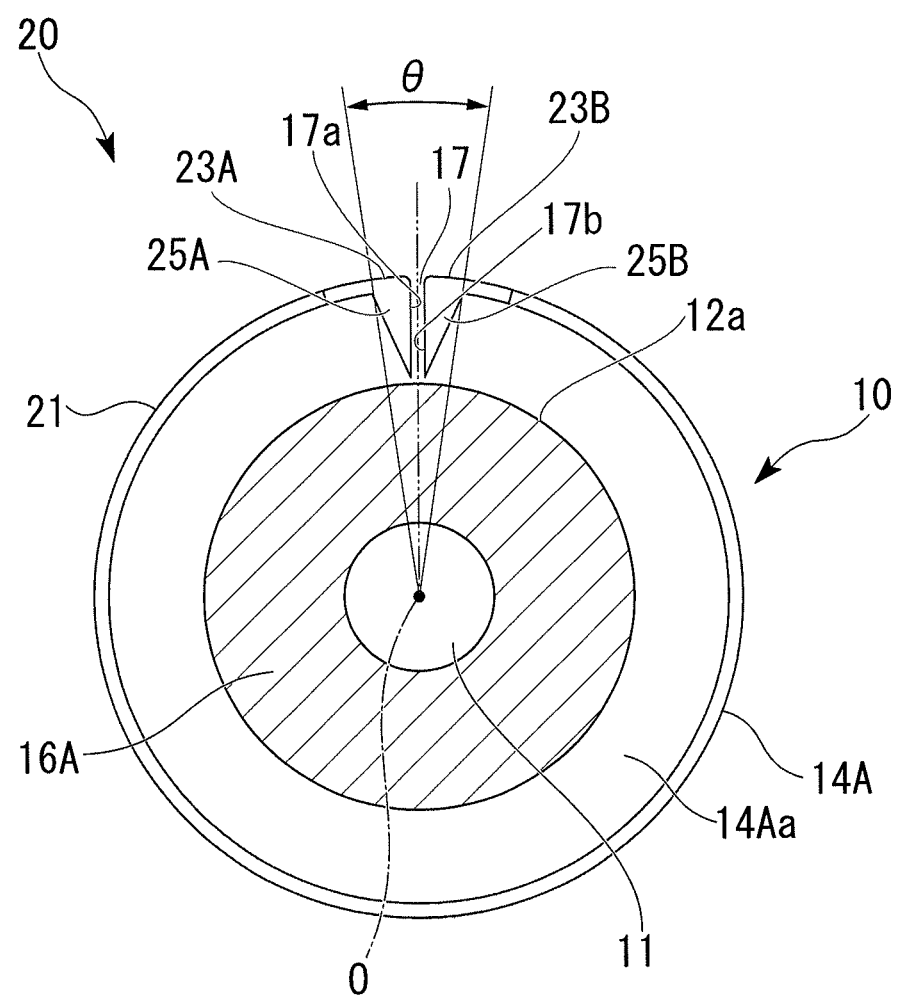
FIG. 3 is a vertical cross-sectional view taken along the line shown in FIG. 2.

FIGS. 1 to 3 show an entire configuration of the optical fiber winding reel 10 according to the first embodiment of the invention.

FIGS. 4 to 9 enlarge and show a relevant part of the optical fiber winding reel 10 according to the first embodiment, particularly, a portion that is close to a slit 17 of a main flange 14A.

Particularly, the reel of the invention is used to mainly wind an optical fiber (optical fiber element wire), that is, a bare optical fiber around the reel. In the optical fiber, the bare optical fiber is formed of a core and a cladding is formed therein, and the bare optical fiber is coated with a protective coating layer.

Accordingly, in the explanation described below, the optical fiber is used as an object to be wound around the reel.

Figure 19:
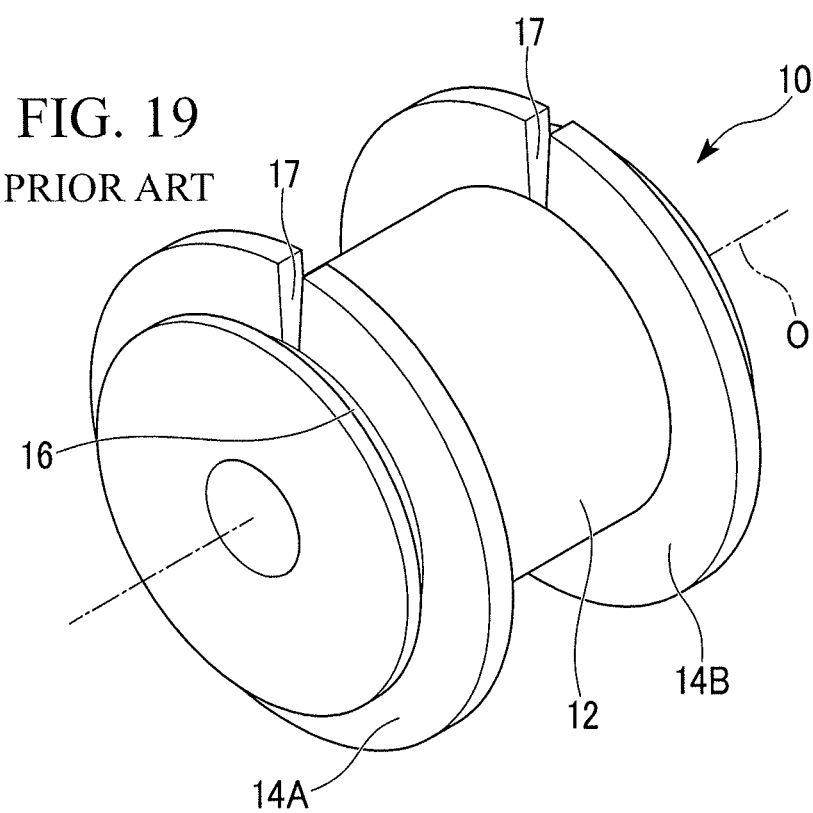
FIG. 19 is a perspective view showing another example of a conventional optical fiber winding reel, particularly, a reel having a main flange on which a slit is formed.

FIGS. 1 to 9, basically, similar to a conventional reel shown in FIG. 19, the reel 10 is configured to include: a cylindrical main winding body 12 (main winding member); and flanges 14A and 14B that are provided at both ends of the main winding body in the axis direction thereof and each of which has a diameter larger than the outer diameter of the main winding body 12.

Particularly, in the description, in order to distinguish between the flanges 14A and 14B and auxiliary flanges 18A and 18B which will be described later, the flanges 14A and 14B which have a large diameter and are located on both sides of the main winding body 12 are referred to as a main flange.

Furthermore, auxiliary winding bodies 16A and 16B are formed outside the main flanges 14A and 14B.

The auxiliary flanges 18A and 18B which have a diameter smaller than the outer diameter of the main flanges 14A and 14B are provided outside auxiliary winding bodies 16A and 16B, respectively.

Additionally, the entire body of the reel 10 is made of a relatively hard resin such as an ABS resin or a metal such as aluminum.

Moreover, a shaft hole 11 into which a rotation shaft of a winding device or a feeding device is to be inserted is formed in the reel 10 so as to penetrate therethrough along a rotation central axis line O.

Particularly, in a commonly-used reel that is used to wind an optical fiber around the reel, in many cases, a keyway is formed in advance at the external position of the shaft hole 11 on the side surfaces of both ends of the reel in the axis direction thereof. In this configuration, a pin (key) that is used to apply a rotational driving force to the reel is inserted into the keyway.

Moreover, in most cases, in order to prevent a lower layer of optical fiber wound layers from being pressed, a cushioning layer such as a sponge is provided on the outer peripheral face of the main winding body 12.

Accordingly, also in the reel of the invention, the keyway which is not shown in drawings may be formed and the cushioning layer may be provided.

Here, a structure is adopted in which the auxiliary winding bodies 16A and 16B and the auxiliary flanges 18A and 18B are provided on the flanges located on both sides of the reel 10 in the axis direction thereof in the embodiment. However, it is only necessary to provide the auxiliary winding body on at least the end side serving as the winding start side.

Consequently, the auxiliary winding body and the auxiliary flange may be provided only on the end side of the reel 10.

Moreover, in the case of providing the auxiliary winding bodies and the auxiliary flanges on both ends of the reel 10, the main flange 14A provided on one end side and the main flange 14B provided on the other end side are only necessary to have a symmetric configuration or the same configuration, the auxiliary winding body 16A provided on one end side and the auxiliary winding body 16B provided on the other end side are only necessary to have a symmetric configuration or the same configuration, and the auxiliary flange 18A provided on one end side and the auxiliary flange 18B provided on the other end side are only necessary to have a symmetric configuration or the same configuration.

For this reason, in the explanation described below, it is envisioned that the region in which the main flange 14A provided on one end side is a winding start side, and the main flange 14A will be particularly described. Since the configuration of the main flange 14B provided on the other end side is similar to that of the main flange 14A, the explanations thereof are omitted or simplified here.

A flange portion 21 is formed on the main flange 14A. Similar to a flange of a conventional reel, the flange portion is configured to protrude from the outer circumferential edge portion of the main flange 14A in a direction parallel to the rotation axis line O and directed to the outside thereof (directed to the position at which the auxiliary winding body 16A is located).

The flange portion 21 is used to reinforce the main flange 14A; however, the flange portion is not necessarily required. Here, the structure in which the flange portion 21 is provided on the main flange 14A will be described.

Generally, in most cases, the main flange 14A is reinforced by radially forming a plurality of linearly-projecting portions (rib) on the outer surface 14Aa of the main flange 14A at a distance in the circumferential direction.

Also in the embodiment, it is preferable to provide such projected portions (rib). In order to prevent drawings from being complicated, a plurality of linearly-projecting portions (rib) which are provided on the outer surface 14Aa of the main flange 14A are not shown in the figure.

Furthermore, the slit 17 that extends from the outer circumferential edge portion of the main flange 14A toward the central axis line O of the reel is formed on the main flange 14A.

The slit 17 is formed so as to extend from a position of the outer circumferential edge portion of the main flange 14A and so as to reach a position on the outer peripheral face 12a (winding body surface) of the main winding body 12 (main winding member).

Particularly, in the example shown in the drawings, a pair of surfaces 17a and 17b (opposed faces) that face each other at the slit 17 in the circumferential direction of the main flange 14A are parallel to each other along the surface orthogonal to the circumferential direction of the main flange 14A (consequently, the surface orthogonal to the central axis line O of the reel).

Additionally, the slit width W1 (a width of air space), that is, a space W1 between the opposed faces 17a and 17b (refer to FIGS. 5 and 6) is a constant width in the region from the position of the outer circumferential edge portion of the main flange 14A to the position on the outer peripheral face 12a (winding body surface) of the main winding body 12 (main winding member).

However, depending on the cases, the slit 17 may be formed such that the slit width W1 slightly varies in a direction from the position of the outer circumferential edge portion of the main flange 14A to the position on the outer peripheral face 12a (winding body surface) of the main winding body 12 (main winding member).

Similar to the slit of the conventional optical fiber winding reel of which is described above with reference to FIG. 19, the slit 17 is used to guide the optical fiber from the outside of the main flange 14A (the position of the auxiliary winding body 16A) into the main winding body 12.

That is, as a result of forming the slit 17 on the main flange 14A in advance, the winding start side of the optical fiber can be firstly wound around the auxiliary winding body 16A and the optical fiber can be subsequently dropped into the slit 17 during winding an optical fiber around the reel. Accordingly, the optical fiber can be easily guided from the outside of the main flange 14A to the outer peripheral face of the main winding body 12 (winding surface).

Here, a width W1 of the slit 17 is not particularly limited; however, a width of the slit is larger than an outer diameter of the optical fiber so that the optical fiber can be smoothly guided, additionally and it is preferable that a width of the slit be relatively small width so as not to adversely affect to the strength of the main flange 14A. Generally, it is only necessary to set a width of the slit in the range of approximately 1 mm to 10 mm.

Furthermore, low rigidity regions 23A and 23B serving as the characteristic configuration of the invention are provided on the portions that are located on both sides of the slit 17 on the main flange 14A. The low rigidity regions have the degree of rigidity that is locally lower than that of the portions far from the slit 17.

In the embodiment, as a result of reducing a thickness T (thickness in a direction parallel to the central axis line O of the reel) of the portions that are located on both sides of the slit 17 and are on the plate surface of the main flange 14A so that the thickness T becomes smaller than the thickness $T_0$ (original flange thickness of the main flange 14A) of the portions that are far from the slit 17, the low rigidity regions 23A and 23B have a low degree of rigidity.

That is, as described below in detail, as a result of forming inclined surfaces 25A and 25B on the plate surface (flange plate surface) which is positioned at the portions that are located on both sides of the slit 17 of the main flange 14A, the low rigidity regions 23A and 23B is formed.

Furthermore, in the case of the embodiment, the low rigidity regions 23A and 23B have a width W2 which is along the circumferential direction of the main flange 14A, and the width is determined such that the width becomes smaller in a direction from the outer circumferential edge of the main flange 14A to the position on the outer peripheral face of the main winding body 12.

Particularly, the flange portion 21 does not include the portion having the width W2 in the low rigidity regions 23A and 23B and along the circumferential direction of the main flange 14A.

Additionally, the low rigidity regions 23A and 23B extend along in the radial-inner direction of the main flange 14A; however, the front-end positions of the low rigidity regions 23A and 23B, which are close to the main winding body 12, is determined such that the front-end positions do not reach the position on the outer peripheral face of the main winding body 12.

However, in the embodiment, the front-end positions are determined to reach the position adjacent to the position on the outer peripheral face of the main winding body 12.

Furthermore, the low rigidity regions 23A and 23B that are located on both sides of the slit 17 of the main flange 14A will be particularly described with reference to FIGS. 4 to 9.

In the embodiment, the thicknesses of the low rigidity portions 23A and 23B are thin, however, are not uniform.

As a result of forming the inclined surfaces 25A and 25B on the flange plate surface of the main flange 14A and at the portions that are located on both sides of the slit 17 of the main flange 14A, the low rigidity portions 23A and 23B have surfaces such that the thicknesses thereof vary.

Figure 5:
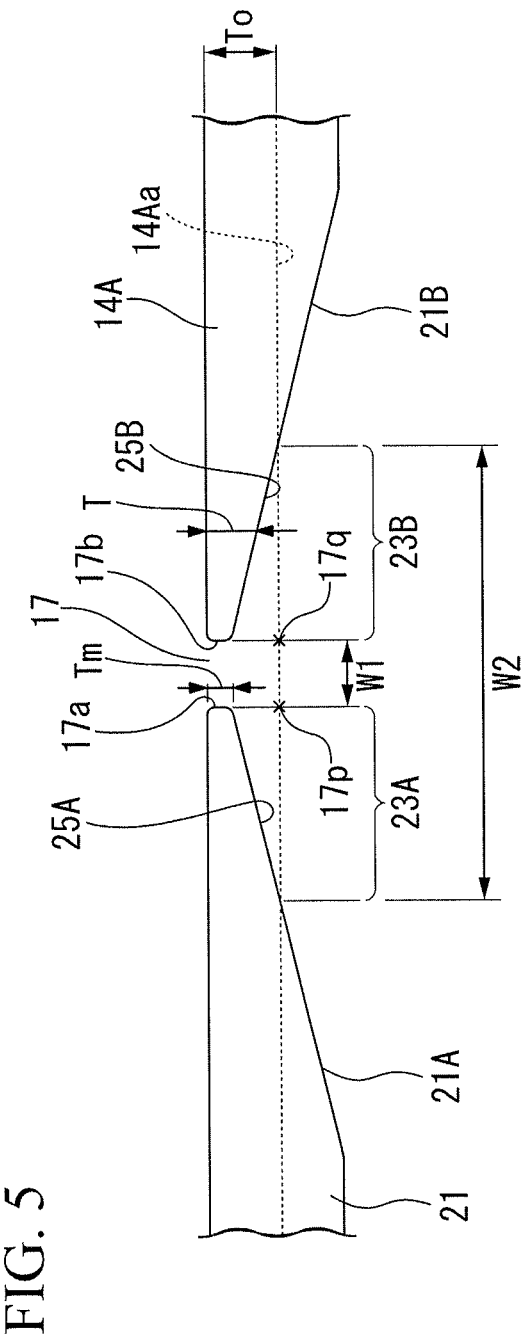
FIG. 5 is a plan view as seen in the direction of the arrow V shown in FIG. 4.

That is, on the portions that are located on both sides of the slit 17 (at which the low rigidity portions extend to the position adjacent to the main winding body 12 so as not to reach the position on the outer peripheral face of the main winding body 12 in a radial-inner direction from the outer peripheral faces of the low rigidity portions 23A and 23B to the inner side of the main flange 14A), the inclined surfaces 25A and 25B are formed by scraping the outer surface 14Aa of the main flange 14A that has a portion having the original thickness $T_0$ so that the flange plate surfaces thereof are formed in an inclined shape (refer to FIGS. 5 and 8).

Accordingly, the low rigidity portions 23A and 23B are formed.

Specifically, the flange thicknesses of the inclined surfaces 25A and 25B gradually increase in a direction from the position of the outer circumferential edge portion of the main flange 14A to the inside thereof.

Finally, the flange thicknesses of the inclined surfaces 25A and 25B are the same as the original flange thickness $T_0$ at the position on the outer peripheral face 12a (winding body surface) of the main winding body 12 (main winding member).

Furthermore, the thicknesses of the flange plate gradually increase in the direction from the position of the slit 17 to both side portions that are far from the slit 17 in the circumferential direction of the main flange 14A, and the inclined directions of the inclined surfaces is thereby determined so that the flange thickness finally becomes equal to the original flange thickness $T_0$.

Consequently, the inclined surfaces 25A and 25B are formed in a shape obtained by scraping a substantially three-sided pyramid shaped portion from the plate surface of the main flange 14A located at both side portions of the slit 17 (outer face side of the main flange 14A). Particularly, the substantially three-sided pyramid shaped portion is removed from one of the two plate surfaces located at both side portions of the slit 17 (one of outer face sides of the main flange 14A, left side of FIG. 5) and the inclined surface 25A is thereby formed. Here, the apex of the three-sided pyramid shaped portion is located at the outside position 17p (the reel outside position on the assumption that the inclined surface 25A is not cut out, refer to FIG. 5) that corresponds to the outer-circumferential-opening edge 17c located at the slit 17. Similarly, the substantially three-sided pyramid shaped portion is removed from the other of the two plate surfaces located at both side portions of the slit 17 (one of outer face sides of the main flange 14A, right side of FIG. 5) and the inclined surface 25B is thereby formed. Here, the apex of the three-sided pyramid shaped portion is located at the outside position 17q (the reel outside position on the assumption that the inclined surface 25B is not cut out, refer to FIG. 5) that corresponds to the outer-circumferential-opening edge 17d located at the slit 17.

In other words, the inclined surfaces 25A and 25B are formed in a three-dimensional fan shape.

Here, in the case where a thickness of the thinnest portion (the outer-circumferential-opening edges 17c and 17d located at the slit 17) (minimum thickness) of the low rigidity portions 23A and 23B which have gradually-thin thicknesses by forming the inclined surfaces 25A and 25B, respectively, is represented as Tm, a thickness T gradually increases from the minimum thickness TM to the maximum thickness $T_0$ (original flange thickness) in the direction from the thinnest portion to the inner face of the main flange 14A and in the directions from the thinnest portions to the both sides in the circumferential direction of the main flange.

Particularly, in consideration of the degree of rigidity that is to be reduced to obtain a function of the above low rigidity portion such as the original flange thickness $T_0$ and the height of the main flange 14A (or the angle of gradient of the inclined surfaces 25A and 25B), it is only necessary to suitably determine the minimum thicknesses Tm of the low rigidity portions 23A and 23B formed by the inclined surfaces 25A and 25B so as to avoid the strength thereof from being excessively degraded by an excessive reduction in the thickness.

Generally, it is preferable that the minimum thicknesses Tm of the low rigidity portions 23A and 23B be in the range of approximately ⅓ to ⅔ of the original flange thickness $T_0$ of the main flange 14A. In the case of the embodiment, the minimum thickness Tm is approximately ½ of the original flange thickness $T_0$.

Moreover, in the embodiment, the flange portion 21 protrudes from the outer circumferential edge portion thereof toward the outside of the main flange 14A.

Also, the flange portion 21 is scraped from the outside thereof at the portion close to the slit 17. Particularly, as a result of cutting the flange portion 21 from the outside thereof at the portion close to the slit 17, an inclined surface 21A that is continuously connected to the inclined surface 25A is formed on the flange portion 21. Similarly, as a result of cutting the flange portion 21 from the outside thereof at the portion close to the slit 17, an inclined surface 21B that is continuously connected to the inclined surface 25B is formed on the flange portion 21.

It is preferable that the thin-thickness low rigidity regions 23A and 23B which are formed by the inclined surfaces 25A and 25B and are located on both sides of the slit 17 be located in a relatively small angle range θ and in a limited region with reference to the central axis line O of the reel.

In other words, this means that it is preferable to form the thin-thickness low rigidity regions 23A and 23B only in a limited narrow range in the circumferential direction on the outer circumferential edge portion of the main flange 14A.

Figure 4:
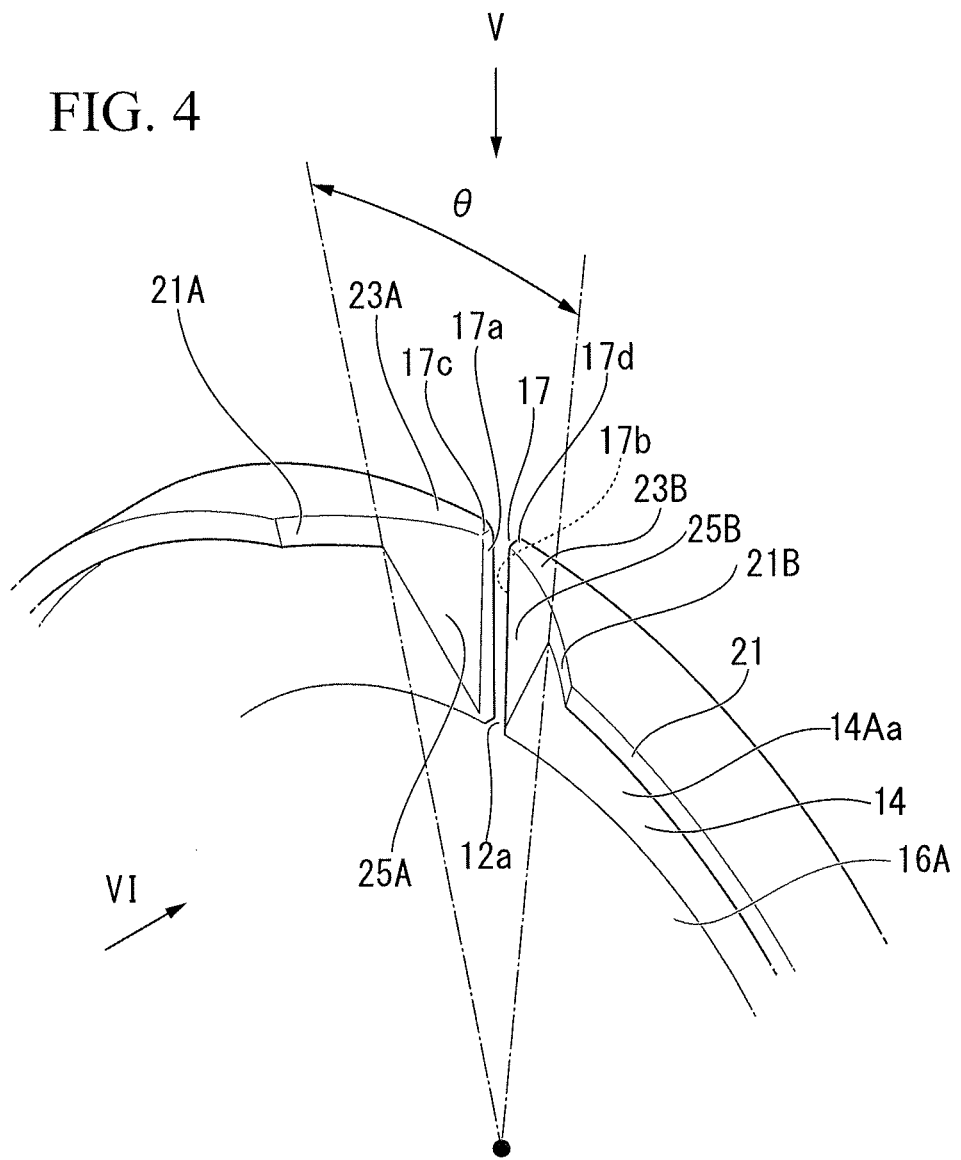
FIG. 4 is an enlarged perspective view showing the relevant part of an optical fiber winding reel according to the first embodiment, particularly, the position close to the slit of the main flange.
Figure 6:
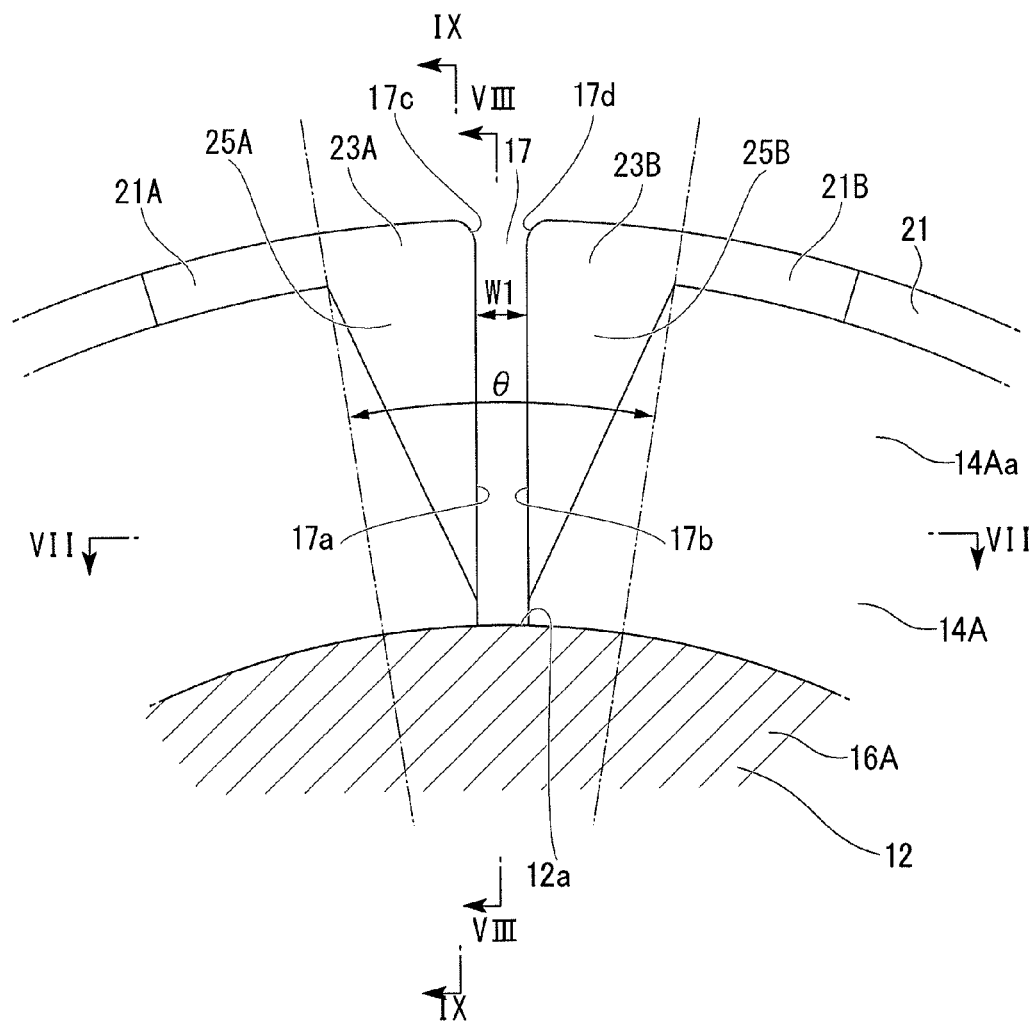
FIG. 6 is a vertical cross-sectional view as seen in the direction of the arrow VI shown in FIG. 4.
Figure 9:
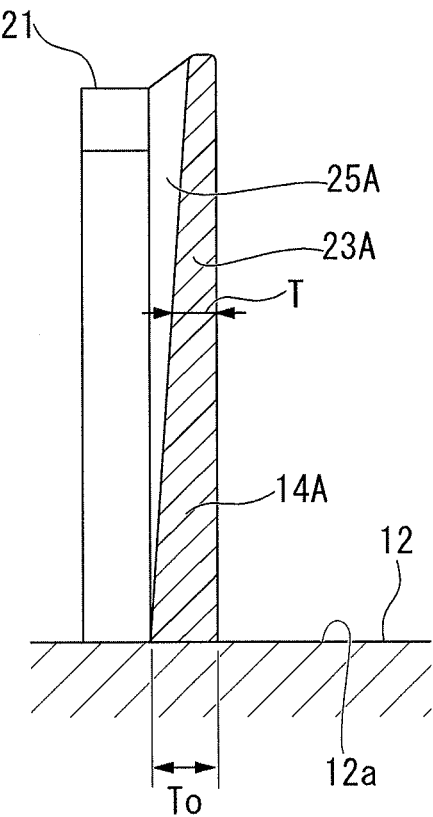
FIG. 9 is a vertical cross-sectional view taken along the line IX-IX shown in FIG. 6.

In particular, as shown in FIGS. 3, 4, and 6, a range of an angle θ, that is, a forming range of the aforementioned thin-thickness low rigidity regions 23A and 23B means that the slit 17 has a degree of spreading such that one-half of the slit has an angle of θ/2 with reference to the center between the opposed faces 17a and 17b of the slit 17.

Furthermore, the reference position (angle measurement position) used to set the above angle is located on the position of the outer circumferential edge portion of the main flange 14A.

However, except for a protruding portion of the flange portion 21, only in consideration of the portion that is formed by reducing the original thickness $T_0$ of the main flange plate 14A, the above-mentioned angle θ is determined.

The reason that it is preferable to narrow the range of the angle θ as stated above will be described below.

In the invention, only a narrow region located on both sides of the slit 17 of the main flange 14A is defined as a region (low rigidity regions 23A and 23B), which has the degree of rigidity that is locally lower than that of the portion far from the slit 17 of the main flange 14A.

When the user puts their finger on the region during holding the reel, the region is bent easier than the portion far from the slit 17 (high rigidity region). However, the focus of the invention is that, as a result of forming the low rigidity region at a local position so that the formed range of the low rigidity region is in a narrow range, the region in which a space is generated becomes narrower than ever before.

As a result of narrowing the space generation region as mentioned above, it is difficult even for the optical fiber to drop into the space even in the case where a space having a width larger than the outer diameter of the optical fiber occurs.

That is, if the widths of the low rigidity regions 23A and 23B are excessively wide, adversely, a region in which warpage of the flange plate is generated becomes large, a space generation region that is larger than or equal to the outer diameter of the optical fiber becomes wide, and the optical fiber easily drops into the space.

Because of this, it is preferable that the low rigidity regions 23A and 23B be located in a limited and relatively small angle range θ with reference to the central axis line O of the reel.

In particular, a suitable and specific numerical value range of the aforementioned angle θ varies depending on the degree of ease of bending of the low rigidity region when a user puts their finger on one of the low rigidity regions located next to the slit 17 of the main flange 14A and a force is applied to this low rigidity region (when a load is applied to the outer-peripheral end in the direction orthogonal to the plate surface).

Moreover, the aforementioned numerical value range varies depending on the degree of ease with which the optical fiber drops into the space when the space having a width larger than or equal to that of the optical fiber is generated at the same time as in the case where a force is applied to the low rigidity region in the above-described manner.

The degree of ease of bending of the low rigidity region varies depending on: the magnitude of force which is applied to the outer circumferential edge of the main flange and which is calculated from the lengths of portions forming the reel and the total weight of the reel in the case where the fiber is wound around the reel when a user holds the reel with their one hand; the materials used to form the reel (strength of materials); and the degree of rigidity of the low rigidity region (in the case of the embodiment, a thickness of the low rigidity region) or the like.

Furthermore, the degree of ease with which the optical fiber drops into the space varies depending on: the characteristics (particularly, the degree of smooth of the surface, the degree of viscosity, or the like) of the surface of the wound optical fiber (coated layer); and the magnitude of the tension that is applied to the optical fiber when the optical fiber is wound around the reel or the like.

For this reason, since a suitable and specific range of the aforementioned angle θ varies depending on the reel, the optical fiber, or condition of winding the fiber around the real, it is inappropriate to mention such suitable and specific range in a generalizing manner. However, as described below in detail, in the case of using the optical fiber winding reel having a commonly-used shape and lengths and in the case of fully winding a general optical fiber for communication around the reel by a general winding tension, it is suitably determined that the above range of the angle θ is within 60 degrees, particularly, within 45 degrees.

In contrast, in the case where the range angle θ of the thin-thickness low rigidity regions 23A and 23B becomes excessively narrow, there is a concern that a user cannot put their thumb on the low rigidity regions 23A and 23B when the user holds the reel.

For this reason, it is preferable that the above-described angle θ be larger than or equal to a certain degree. Generally, it is preferable that the angle be 10 degrees or more with reference to the center of the slit. That is, it is preferable that one-half of the angle θ which corresponds to an angle of the area next to the slit center be 5 degrees or more.

Accordingly, based on the above consideration, the angle θ of the low rigidity regions 23A and 23B is approximately 30 degrees in the embodiment.

That is, the angle θ/2 of the region located next to the slit center is approximately 15 degrees.

A situation in which warpage is generated at near the slit 17 in the optical fiber winding reel according to the first embodiment described above will be described below. Particularly, in a state where an optical fiber is wound around the main winding body 12, a user inserts their finger (for example, the index finger or the middle finger, other than their thumb) into a shaft hole provided on the center portion of the end face of the reel, the user puts their thumb on the outer circumferential edge portion of the main flange 14A, that is, on the outer circumferential edge portion close to the slit 17, and the user holds the reel so that the central axis line O is horizontal in a way similar to the case shown in FIG. 20. In this case, a condition in which the warpage is generated near the slit 17 in the optical fiber winding reel is shown in FIG. 10 while comparing a conventional reel shown in PART (b) of FIG. 21.

In the optical fiber winding reel according to the embodiment, the thickness of the main flange is reduced so that the regions located on both sides of the slit 17 of the main flange 14A are formed in an inclined shape.

Accordingly, the regions (the low rigidity regions 23A and 23B) having a low degree of rigidity which is locally lower than that of the portion far from the slit 17 of the main flange 14A.

Figure 10:
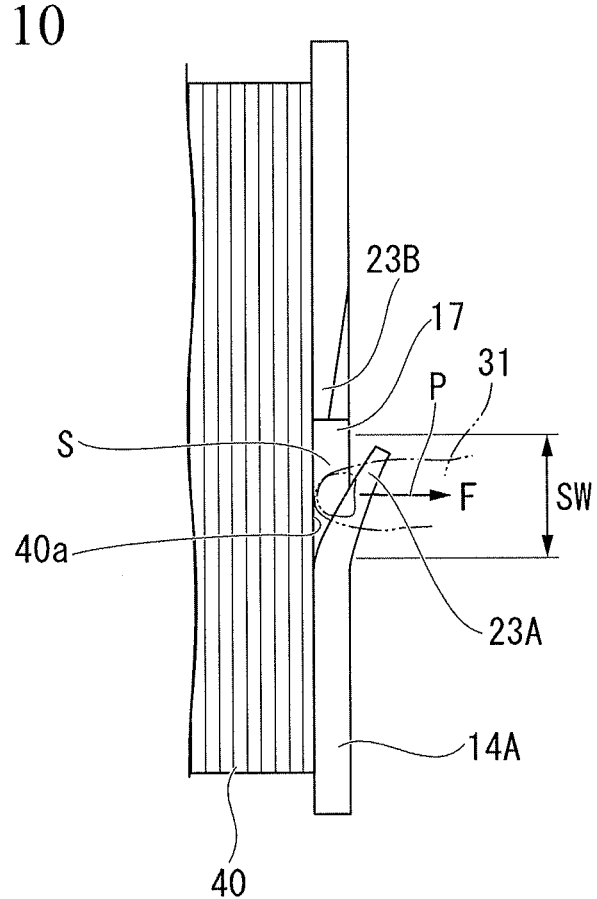
FIG. 10 is a schematic view conceptually showing a situation where the main flange is deformed near the slit when user holds the optical fiber winding reel with their fingers of one hand so that the central axis line thereof is horizontal.

As shown in FIG. 10, when, for example, a user puts their finger on the low rigidity region 23A, that is, one of the low rigidity regions at the position close to the slit 17, a force F is applied to the plate surface of the main flange 14A in the direction perpendicular to the plate surface. At this time, the low rigidity region 23A is easily deformed and relatively largely bent outward, a relatively large space S is generated between the inner surface of the low rigidity region 23A and the surface 40a of the optical fiber layers 40 wound around the main winding body 12.

Figure 21:
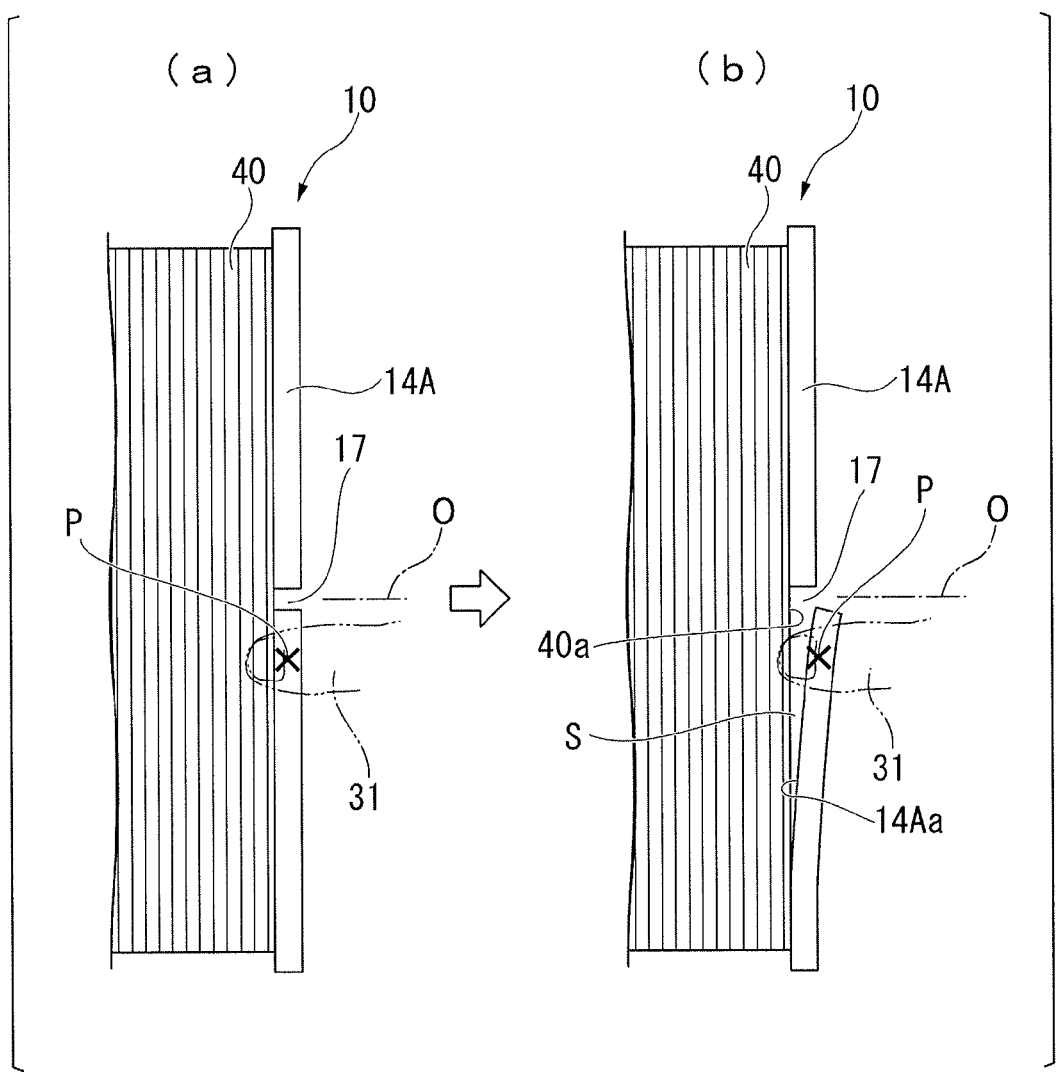
FIG. 21 is a schematic view as seen from the upper surface side of the reel, showing a situation where the main flange is deformed near the slit when a user holds a conventional reel shown in FIG. 19 with their fingers.
Figure 22:
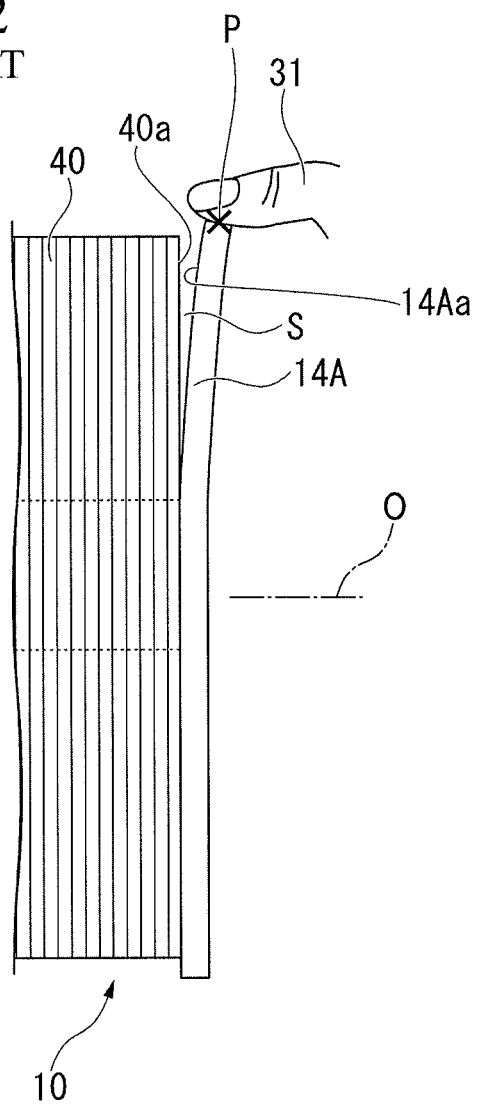
FIG. 22 is a schematic view as seen from the side face of the reel, showing the deformation situation shown in PART (b) of FIG. 21.

In this situation, the maximum value of the width of the space S becomes larger than that in the case of using a conventional reel shown in PART (b) of FIG. 21 (low rigidity regions are not formed at both side portions located at the slit).

Accordingly, the space S having a width larger than the outer diameter of the optical fiber (for example, 0.25 mm or more) is relatively easily generated.

However, as a result of generation of relatively large deformation of the low rigidity region 23A, a force generated when the user puts their finger on the low rigidity region is hardly applied to the portion outside the low rigidity region 23A (the main flange 14A having an original flange thickness, a high rigidity portion).

Furthermore, even if the force is applied to the high rigidity portions located on both sides of the rigidity regions, since the magnitude of the force applied to the high rigidity portion becomes relatively low, the high rigidity portions located on both sides of the rigidity regions do not deform (are not bent outward).

Consequently, the range SW, in which a large space S (a space having a width larger than the outer diameter of the optical fiber) is generated by generation of warpage deformation, becomes narrower than that in the case of using the conventional reel shown in PART (b) of FIG. 21.

Therefore, as the range in which the space S having a width larger than the outer diameter of the optical fiber is generated becomes narrower as described above, the optical fiber forming the optical fiber layers 40 wound around the main winding body 14A less drops into the space S.

Accordingly, it is possible to prevent the winding shape from being deformed by dropping of the optical fiber into the space S, and it is possible to prevent an increase in a transmission loss of the optical fiber in the optical fiber layers by applying a lateral pressure thereto.

Figure 20:
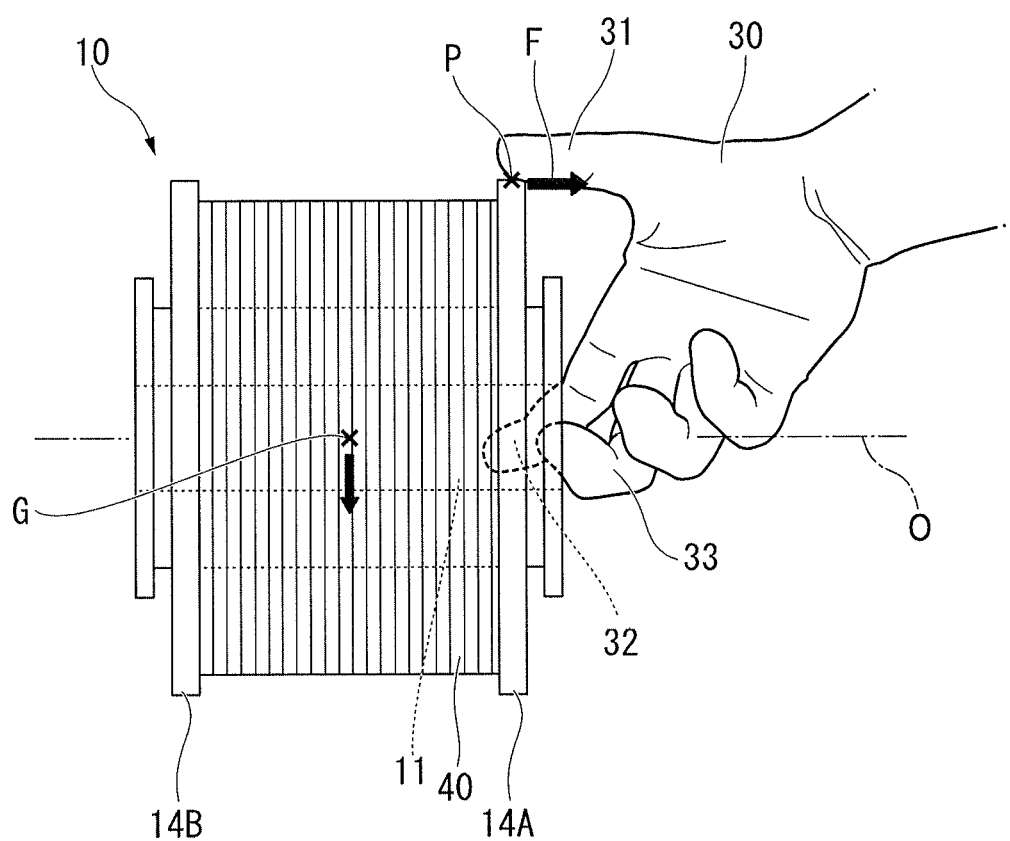
FIG. 20 is a schematic view showing an example situation where a user holds a conventional reel shown in FIG. 19 with their fingers of one hand so that the central axis line thereof is horizontal.

Next, regarding the optical fiber winding reel according to the above-described first embodiment of the invention and a conventional reel on which low rigidity regions having a gradually-thin thickness are not formed at both side portions located at the slit, experiments were carried out while a user holds the above reels so that the reel center axis line O is horizontal as shown in FIG. 20 and a situation in which a space is generated was checked.

The experimental results will be described below as an experimental example of the invention and comparative experiment example.

Comparative Experiment Example

A conventional reel which does not include low rigidity regions having a thin thickness at both side portions located at the slit (configuration schematically shown in FIG. 19) was checked.

The lengths and materials of portions of the reel are as follows.
 Outer diameter of main flange 14A: 265 mm
 Outer diameter of main winding body 12: 175 mm
 Height of the main flange 14A (={outer diameter of main flange 14A)—(outer diameter of main winding body 12)}/2): 45 mm
 Thickness of main flange 14A (flange thickness): 4 mm
 Internal diameter of shaft hole 11: 25 mm
 Flange portion 21 expanding outward from outer circumferential edge of main flange 14A: Presence (the thickness is 2 mm and the protruding length; 10 mm)
 Ribs provided on outer surface of main flange 14A: Presence (formed in a rectangular shape in cross section, the rib height is 4 mm, the rib width is 2 mm, and the number of ribs is 35 such that the ribs radially extend from the center)
 Slit 17: opposed faces between which the slit 17 is provided are orthogonal to a plane perpendicular to the reel center axis line O and are substantially parallel to the radial direction of the reel. The slit width is approximately 5 mm. The slit reaches a position located on a surface of a main winding body.
 Reel material: ABS Furthermore, the optical fiber wound around the reel has an outer diameter of 0.25 mm, the surface thereof is coated with an ultraviolet curable resin. The optical fiber is fully wound around the reel by a winding tension of 70 g.

The total weight of the optical fiber wound around the reel was 4.0 kg.

Regarding the conventional reel around which the optical fiber is wound as mentioned above, an experiment of holding the reel with one hand so that the reel center axis line O is horizontal as shown in FIG. 20, that is, an experiment of holding the reel so that a user inserts their index finger 32 and middle finger 33 into the shaft hole 11 that opens at the center portion at the end face of the reel 10 and puts their thumb 31 on the outer circumferential edge portion of the main flange 14A (position far from the center position of the slit 17 by approximately 10 mm) was carried out.

Subsequently, a size of the space S was measured which is generated between the inner surface 14Aa of the main flange 14A and the surface 40a of the optical fiber layers 40 that are wound around the main winding body 12.

Figure 11:
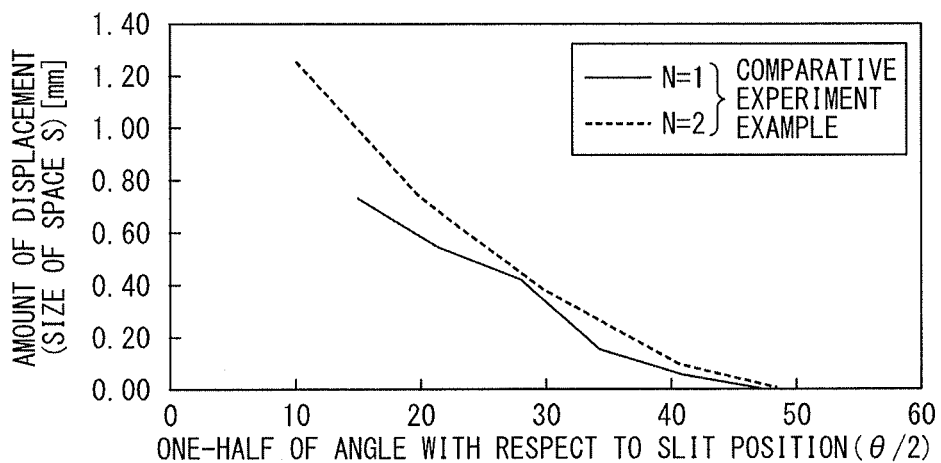
FIG. 11 is a chart explaining a situation where a space is generated in a comparative experiment example in which a user holds a conventional optical fiber winding reel having a slit.

Here, a result of examining the relationship between the aforementioned size of the space S and the half angle θ/2 that is one-half of the angle θ with reference to the center of the slit 17 with respect to the circumferential direction of the main flange is shown in FIG. 11.

Moreover, in consideration of variations, experiments were carried out two times by a different experimenter who holds the reel (N=1, N=2).

As evidenced by FIG. 11, the half angle θ/2 spreads so that a space larger than or equal to the diameter of the optical fiber of 0.25 mm is generated in a range of 0 to 32 degrees with reference to the center position of the slit 17.

Furthermore, in the case where the space larger than or equal to the diameter of the optical fiber (0.25 mm or more) exists in a range of 0 to 32 degrees with reference to the center of the slit 17 as described above, it is confirmed that the optical fiber easily drops into the space.

Experimental Example of Invention

Similar to the above comparative experiment example, by use of the reel according to the first embodiment in which the low rigidity regions 23A and 23B having a gradually-thin thickness are formed at both sides of the slit 17, an experiment of holding the reel with one hand was carried out so that the reel center axis line O is horizontal.

The reel used in this experiment is the same as the reel used in the above-described comparative experiment example with the exception that the low rigidity regions 23A and 23B having a gradually-thin thickness are formed at both sides of the slit 17.

Furthermore, the optical fiber wound around the reel is the same as that of the comparative experiment example.

Particularly, as described above with reference to FIGS. 1 to 9, the low rigidity regions 23A and 23B that are located on both sides of the slit and have a thin thickness were formed to have the inclined surfaces by cutting the flange plate surface.

In the formation of the inclined surfaces, the thickness Tm of the minimum-thickness portion located on the outer-peripheral end of the low rigidity regions 23A and 23B having a thin thickness was 2 mm, that is, substantially half of the original thickness $T_0$ (4 mm) of the main flange 14A.

Moreover, the angle range θ of the low rigidity region having a thin thickness was 30 degrees. Therefore, one-half of the angle θ which corresponds to the angle of the area next to the slit center was 15 degrees.

The one-half of the 15-degree angle corresponds to approximately 35 mm in length along the outer-circumference of the main flange.

In addition, in a way similar to the case of the comparative experiment example, the position on which the user puts their thumb at the time of holding the reel is located at a position approximately 10 mm from the center of the slit 17.

This position is located approximately 5 degrees from the center of the slit and is located within the low rigidity region 23A which has a thin thickness.

Subsequently, the size of the space S was measured which is generated between the inner surface 14Aa of the main flange 14A and the surface 40a of the optical fiber layers 40 wound around the main winding body 12 when a user holds one side of the reel with their fingers.

Figure 12:
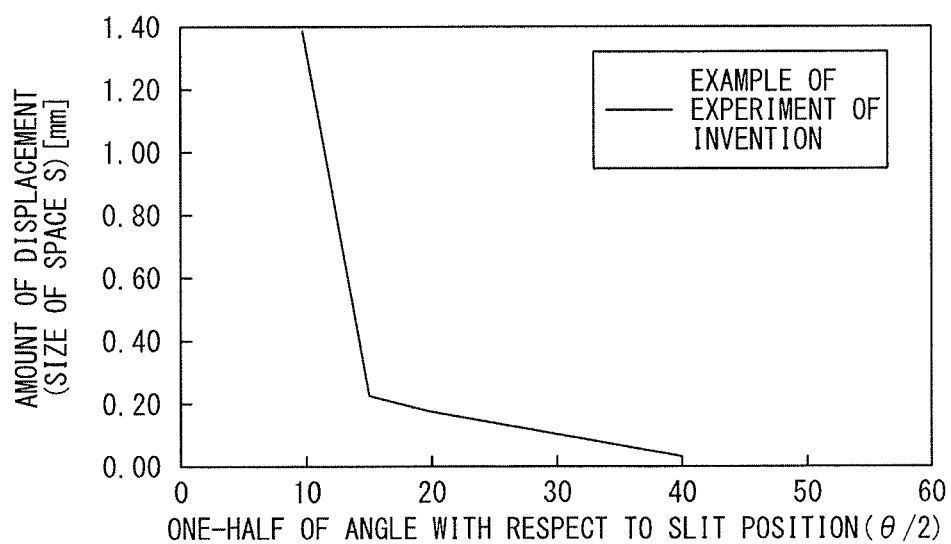
FIG. 12 is a chart explaining a situation where a space is generated in an experimental example of the invention in which a user holds the fiber winding reel having a slit according to the first embodiment of the invention.

Here, a result of examining the relationship between the aforementioned size of the space S and the half angle θ/2 (one-half of the angle θ) with reference to the center of the slit with respect to the circumferential direction of the main flange is shown in FIG. 12.

As evidenced by FIG. 12, in the case where the one-half angle is in a range of up to approximately 15 degrees with reference to the center position of the slit, a space larger than or equal to the diameter of the optical fiber of 0.25 mm is generated; however, in the range where the one-half angle exceeds 15 degrees, a space is smaller than the diameter (0.25 mm) of the optical fiber.

For this reason, as compared to the comparative experiment example (FIG. 11), it is apparent that the space generation region that is larger than or equal to the diameter of the optical fiber of 0.25 mm is reduced to be a half or less.

Here, in the case where the space generation region that is larger than or equal to the diameter of the optical fiber of 0.25 mm in the aforementioned experimental example of the invention is in a narrow range, such as a range of up to 15 degrees, it is confirmed that the optical fiber rarely drops into the space.

In other cases, the inventors carried out another experiments, as a result, it is apparent that, even in the case of using the optical fiber winding reel and the optical fiber which have a widely-used size and satisfy the following conditions, a range of an angle θ of the low rigidity region can be suitably determined.

Conditions

An outer diameter of the main flange 14A is in a range of approximately 240 to 280 mm.

An outer diameter of the main winding body 12 is in a range of approximately 150 to 180 mm.

The length in the axis direction of the main winding body 12 (distance between the main flanges 14A and 14B) is in a range of approximately 80 to 160 mm.

A thickness of the main flange 12 is in a range of approximately 4 to 10 mm.

An internal diameter of the shaft hole is in a range of approximately 25 to 26 mm.

The reel is made of an ABS resin.

An optical fiber having an outer diameter 0.25 mm and having a bare optical fiber which is made of a silica-based glass and is coated with an ultraviolet curable resin, a silicon resin, or a nylon resin is wound around the reel.

The total weight of the reel in a state where the optical fiber is fully wound around the reel by a winding tension in a range of approximately 30 to 100 g is in a range of approximately 2 to 6 kg.

Under the above conditions, it is determined that the proper range of an angle θ of the low rigidity region with reference to the center position of the slit is within 60 degrees, and particularly within 45 degrees.

Here, in the case of using the reel having the above-described sizes, the angle θ of 60 degrees corresponds to a range of approximately 125 mm to 145 mm in length along the circumferential direction of the main flange. Additionally, in the case of using the reel having the above-described sizes, the angle θ of 45 degrees corresponds to a range of approximately 95 mm to 110 mm in length along the circumferential direction of the main flange.

On the other hand, in the above-described first embodiment, a pair of surfaces 17a and 17b (opposed face), which face each other in the circumferential direction of the main flange 14A and are provided in the slit 17, cross the main flange 14A in a direction orthogonal to the circumferential direction thereof, are along a plane substantially parallel to the central axis line O of the reel, and are parallel to each other.

Figure 13:
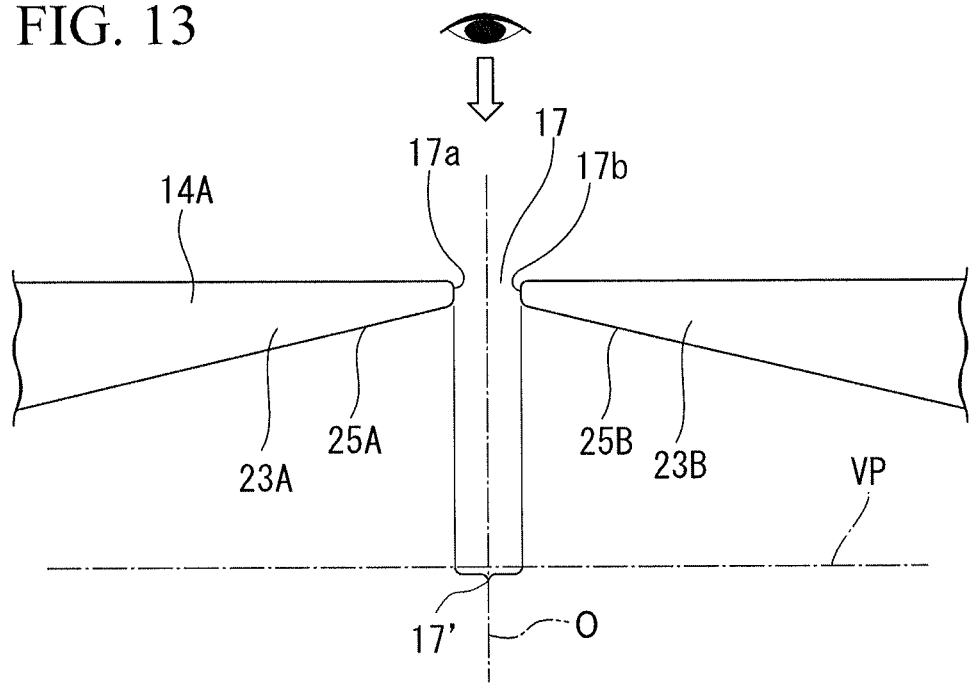
FIG. 13 is a schematic plan view corresponding to FIG. 5 and explaining the slit of the optical fiber winding reel according to the first embodiment.

As stated above, the opposed faces 17a and 17b in the slit 17 are along a plane substantially parallel to the central axis line O of the reel and are parallel to each other. Here, as schematically shown in FIG. 13, in the case of seeing the portion at which the slit 17 is formed in the main flange 14A in a direction from one side of the plate surface of the main flange 14A along a direction parallel to the central axis line O of the reel, one of edge portions that are located on both sides of the slit in the circumferential direction of the main flange 14A does not overlap the other of the edge portions.

In other words, in the case of projecting a slit-formed portion 17 of the main flange on a virtual plane VP orthogonal to the rotation center in the projecting direction parallel to the central axis line O of the reel, one of the edge portions located on both sides of the slit 17 in the circumferential direction of the main flange does not overlap the other of the edge portions. On the projected slit image, the slit 17 is formed so that an air space 17' is present in the slit 17.

For example, the low rigidity region of one of the edge portions may be bent outward when a user puts their finger on the outer circumferential edge of the flange which is located close to one of the edge portions (low rigidity regions 23A and 23B) that are located on both sides of the slit 17 in the circumferential direction of the main flanges 14A and 14B as described above. However, as a result of adopting the above-described slit shape, even in the above case where the low rigidity region of one of the edge portions is bent outward, it is possible to prevent the said one of the edge portions from being in contact with the other of the edge portions, and it is possible to prevent the low rigidity region including the other of the edge portions from being bent outward.

Consequently, a region in which a space having a width larger than the outer diameter of the optical fiber is generated is formed so as to be limited to one side next to the slit 17, the space generation region having a width larger than the outer diameter of the optical fiber is thereby reliably narrow, and it is possible to reliably prevent the optical fiber from dropping into the space.

However, it is not necessary for the opposed faces 17a and 17b in the slit 17 to be parallel to the surface along a plane orthogonal to the central axis line O of the reel.

Figure 14:
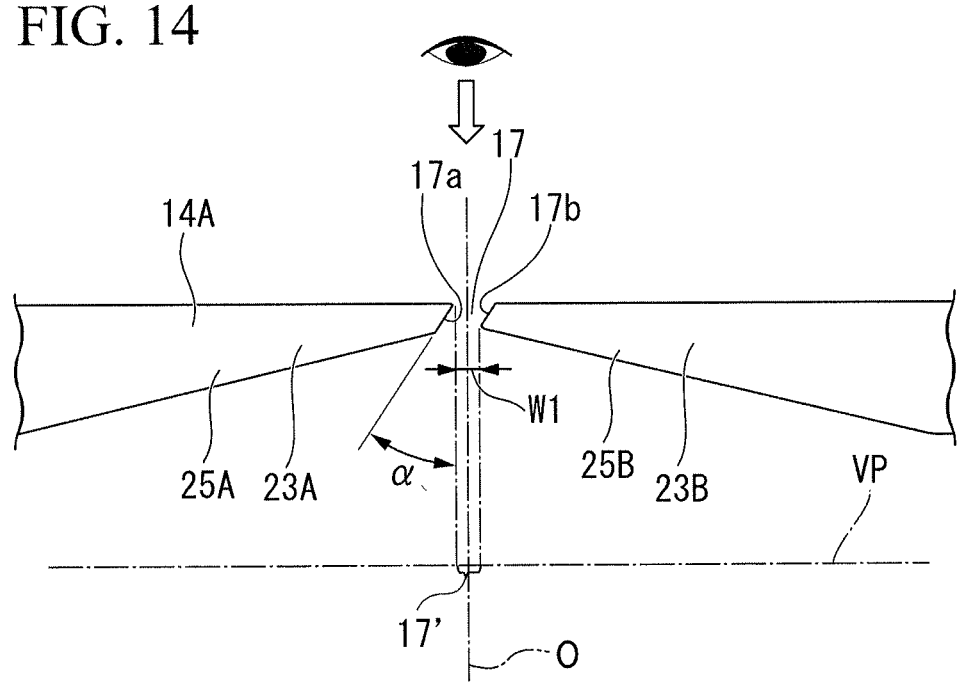
FIG. 14 is a schematic plan view corresponding to FIG. 13 and showing another example of a slit of the optical fiber winding reel in which the invention is applied.

For example, as shown in FIG. 14, the opposed faces 17a and 17b may be surfaces inclined with respect to a plane orthogonal to the central axis line O of the reel at a predetermined angle.

However, even in the above case, in the case of projecting a slit-formed portion 17 of the main flange 14A on a virtual plane VP orthogonal to the rotation center in the projecting direction parallel to the central axis line O of the reel, it is preferable to determine an inclination angle α and a slit width W1 so that one of the edge portions located on both sides of the slit 17 in the circumferential direction of the main flange does not overlap the other of the edge portions.

For example, the low rigidity region 23A or 24B of one of the edge portions may be bent outward when a user puts their finger on the outer circumferential edge of the flange which is located close to one of the edge portions that are located on both sides of the slit 17 in the circumferential direction of the main flanges 14A and 14B as described above. According to the example shown in FIG. 14, even in the above case where the low rigidity region of one of the edge portions is bent outward, it is possible to prevent the said one of the edge portions from being in contact with the other of the edge portions, and it is possible to prevent the low rigidity region 23A or 24B including the other of the edge portions from also being bent outward.

As a result, a region in which a space having a width larger than the outer diameter of the optical fiber is generated is formed so as to be limited to one side next to the slit 17, the space generation region having a width larger than the outer diameter of the optical fiber is thereby reliably narrow, and it is possible to reliably prevent the optical fiber from dropping into the space.

Furthermore, in the aforementioned first embodiment, the front-end positions of the low rigidity regions 23A and 23B having a gradually-thin thickness, which are close to the main winding body 12, are located at the position adjacent to the position on the outer peripheral face of the main winding body 12. The front-end positions do not reach the position on the outer peripheral face of the main winding body 12.

Here, as a result of positioning the front-end positions of the low rigidity regions 23A and 23B as mentioned above, which are close to the main winding body 12, so as not to reach the position on the outer peripheral face of the main winding body 12, it is possible to prevent the degree of rigidity or strength of the base portion of the main flange 14A (portion continuously connected to the main winding body 12) located at near the slit 17 from being degraded as described above. As a result, it is possible to effectively prevent cracking or breakage from being generated at the base portion due to insufficiency of strength of the base portion of the main flange 14A.

Figure 15:
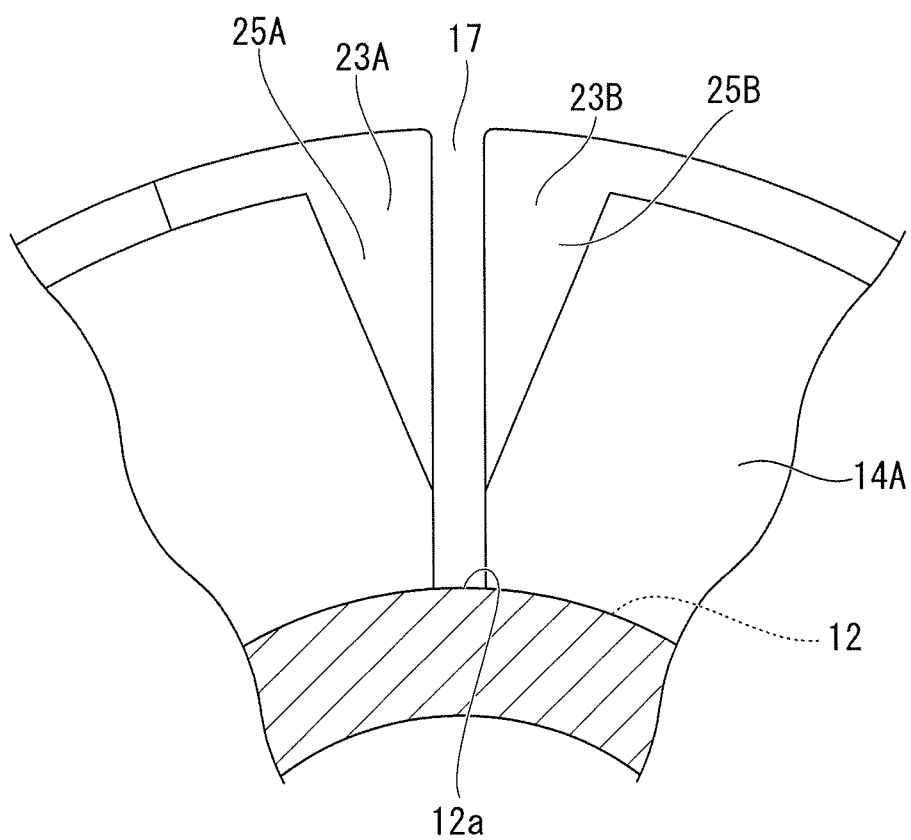
FIG. 15 is a vertical cross-sectional view corresponding to FIG. 6 and showing another example of a range of a low rigidity region located on both sides of the slit of the optical fiber winding reel according to the first embodiment.

However, in order to obtain the above effects, it is not necessary for the front-end position of the low rigidity regions 23A and 23B, which is close to the main winding body 12, to be located at the position adjacent to the position on the outer peripheral face of the main winding body 12. For example, as shown in FIG. 15, the front-end positions 23a and 23b of the low rigidity regions 23A and 23B, which are close to the main winding body 12, may be located at the position slightly far from the position of the outer peripheral face 12a of the main winding body 12 (for example, the position is at approximately ¼ of the height of the flange plate).

Figure 16:
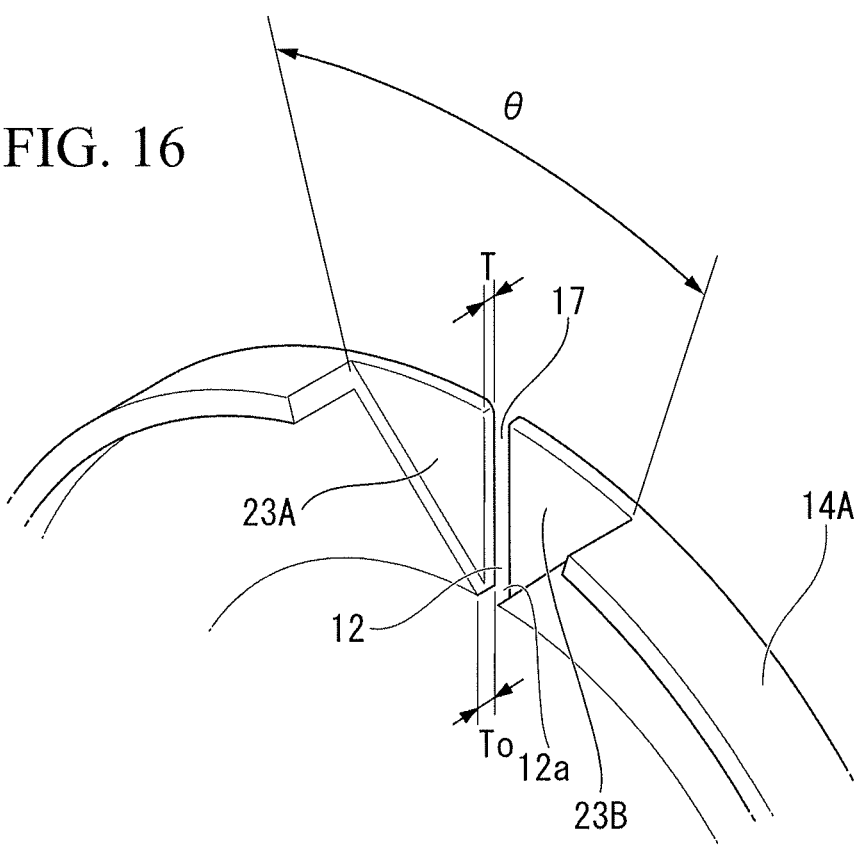
FIG. 16 is a perspective view showing an optical fiber winding reel according to a second embodiment of the invention.

FIG. 16 shows the relevant part of an optical fiber winding reel according to a second embodiment of the invention, particularly, shows the portion close to the slit 17 of the main flange 14A.

The optical fiber winding reel according to the second embodiment is different from the case of the first embodiment in that the low rigidity regions 23A and 23B do not have a gradually-thin thickness and have a uniform thickness.

Particularly, the low rigidity regions 23A and 23B are formed in a uniformly-thin flat surface shape and are thinner than the original thickness (the thicknesses of the regions other than the low rigidity regions 23A and 23B) of the main flange 14A.

That is, the low rigidity regions 23A and 23B are evenly formed to have the thickness T that is entirely thinner than the original thickness $T_0$ (the thicknesses of the regions other than the low rigidity regions 23A and 23B) of the main flange 14A.

Here, the entire shape of the low rigidity regions 23A and 23B is substantially the same as that of the first embodiment with the exception that the thickness T does not vary.

Particularly, the width of the low rigidity regions 23A and 23B in the circumferential direction of the main flange 14A becomes smaller in a direction from the outer circumferential edge of the main flange 14A to the position on the outer peripheral face of the main winding body 12.

Furthermore, the front-end positions of the low rigidity regions 23A and 23B, which are close to the main winding body 12, is determined such that the front-end positions do not reach the position on the outer peripheral face of the main winding body 12.

However, in FIG. 16, the front-end positions are determined to reach the position adjacent to the position on the outer peripheral face of the main winding body 12.

Moreover, similar to the above description, the thin-thickness low rigidity regions 23A and 23B which are formed by the flat-thin portions and are located on both sides of the slit 17 are in a relatively small angle range θ and in a limited region with reference to the central axis line O of the reel.

Similar to the above description, the angle θ is within, for example, 60 degrees; particularly, the angle is suitably within 45 degrees; and it is preferable that the angle be greater than or equal to 10 degrees.

In the embodiment, the angle θ is approximately 30 degrees, that is, one-half of the angle θ which corresponds to an angle of the area next to the slit center is approximately 15 degrees.

Also in the second embodiment shown in FIG. 16, the locally-thin low rigidity regions 23A and 23B are formed at both sides of the slit 17, and the degree of rigidity of the region located on both sides of the slit 17 is locally low. Therefore, in the case where a user puts their finger on the portion near the slit 17 in a manner similar to the first embodiment and the user holds the reel, though the deformation amount at the portion increases, the range in which a large space larger than or equal to the outer diameter of the optical fiber is generated is locally limited. Therefore, the optical fiber forming the optical fiber wound layers less drops into the space.

Figure 17:
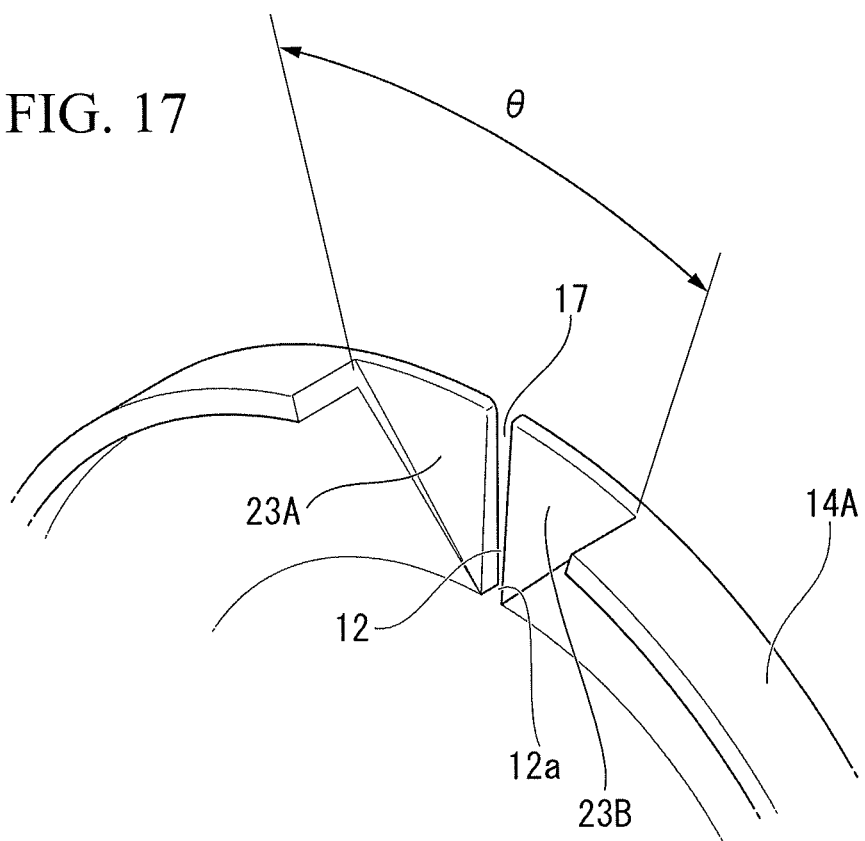
FIG. 17 is a perspective view showing an optical fiber winding reel according to a third embodiment of the invention.
Figure 18:
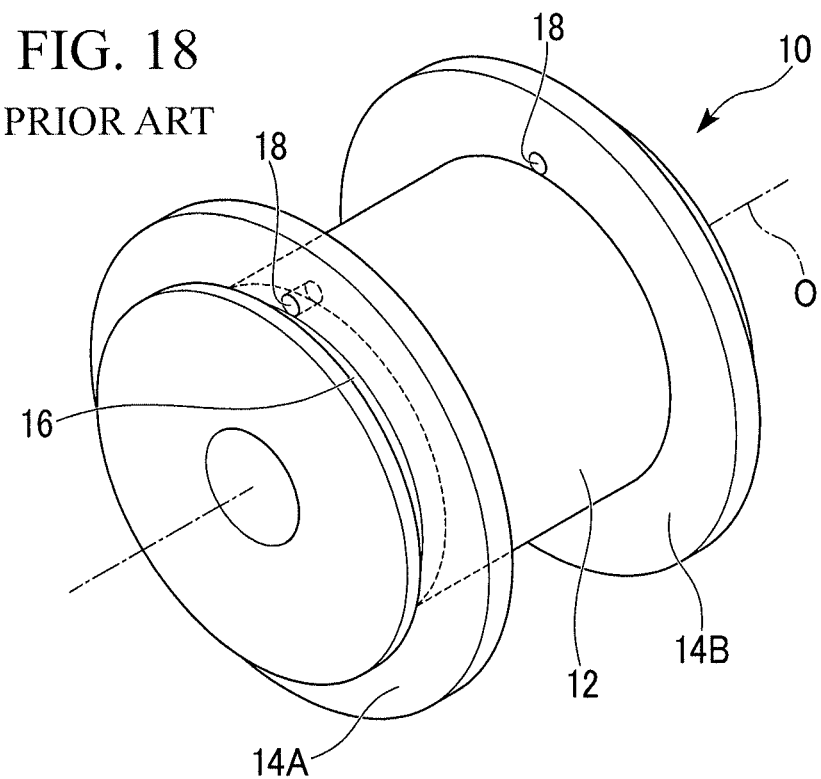
FIG. 18 is a perspective view showing an example of a conventional optical fiber winding reel.

FIG. 17 shows the relevant part of an optical fiber winding reel according to a third embodiment of the invention, particularly, shows the portion close to the slit 17 of the main flange 14A.

In the optical fiber winding reel according to the third embodiment, the thin-thickness low rigidity regions 23A and 23B are configured to include a structure including both characteristics of the first embodiment and the second embodiment (intermediate between the first embodiment and the second embodiment, eclectic).

Particularly, in the third embodiment, the low rigidity regions 23A and 23B that are located on both sides of the slit 17 have a low degree of rigidity by locally reducing a thickness of the flange plate thereof in a way similar to the case of the first and the second embodiments.

Because of this, the thin-thickness low rigidity regions 23A and 23B have a uniform thickness in the circumferential direction of the main flange 14A. Additionally, the thickness is set such that it becomes gradually thinner in the radial direction of the main flange 14A from the outer peripheral face of the main winding body 12 to the outer circumferential edge portion of the main flange 14A.

Particularly, as a result of cutting the plate surface of the main flange 14A so that the surface is inclined in the direction from the outer peripheral face of the main winding body 12 to the outer circumferential edge portion of the main flange 14A, the low rigidity regions 23A and 23B are formed.

Also in this case, the thin-thickness low rigidity regions 23A and 23B located on both sides of the slit 17 are in a relatively small angle range θ and in a limited region with reference to the central axis line O of the reel.

Similar to the above description, the angle θ is within, for example, 60 degrees; particularly, the angle is suitably within 45 degrees; and it is preferable that the angle be greater than or equal to 10 degrees.

In the embodiment, the angle θ is approximately 30 degrees, that is, one-half of the angle θ which corresponds to an angle of the area next to the slit center is approximately 15 degrees.

Also in the third embodiment shown in FIG. 17, the locally-thin low rigidity regions 23A and 23B are formed at both sides of the slit 17, and the degree of rigidity of the region located on both sides of the slit 17 is locally low. Therefore, in the case where a user puts their finger on the portion near the slit 17 in a manner similar to the first and second embodiments and the user holds the reel, though the deformation amount at the portion increases, the range in which a large space larger than or equal to the outer diameter of the optical fiber is generated is locally limited. Therefore, the optical fiber forming the optical fiber wound layers less drops into the space.

Particularly, it is only necessary for the thin-thickness low rigidity regions 23A and 23B located on both sides of the slit 17 to function as regions having a low degree of rigidity that is locally lower than that of the other region of the main flange. Therefore, the invention is not limited to a method of locally reducing the thickness of the main flange (flange plate thickness) and thereby lowering the degree of rigidity thereof as described in the above-described first to third embodiments. The means for locally lowering the above portions may be adopted as a method different from the above-described method.

For example, as a result of forming only the portions located at both side portions of the slit by use of a material having the degree of rigidity that is lower than that of the material used to form the reel including the main flange, the low rigidity regions may be provided on both side portions of the slit.

Particularly, in the case of using, for example, an ABS resin as a material used to form the reel including the main flange, a member that is to be provided on both side portions of the slit is formed by use of a resin (low rigidity) softer than the ABS resin, the member is connected to the main flange by fusion welding or the like and may be integrated into a body.

Moreover, as a different method, a low rigidity region may be formed at both side portions of the slit by adjusting the density of a resin or the mix proportion of component materials of a resin.

However, the advantage of such method of locally reducing a thickness of the main flange (thickness of flange plate) and thereby lowering the degree of rigidity as described in the first to third embodiments is that it is possible to simply and easily form the low rigidity regions as compared with the method of changing the above-described materials.

Furthermore, as a result of forming a U-shaped groove or a V-shaped groove (cutting) in cross-section (or in a direction substantially similar to the direction) at both side portions of the slit so as to extend in the radial direction of the main flange, the low rigidity region may be formed.

As described above, while preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An optical fiber winding reel comprising:
a cylindrical main winding body;
main flanges provided at both respective ends of the main winding body in an axis direction thereof; and
an auxiliary winding body provided outside at least one of the main flanges, wherein:
a slit that extends toward a central axis line of a reel is formed at part in a circumferential direction of the main flange at which the auxiliary winding body is provided,
the main flange has a low rigidity region and a high rigidity region, the low rigidity region being both side portions which are located near the slit and are formed on the main flange, the high rigidity region being located at a position displaced from the low rigidity region in the circumferential direction of the main flange, and
the low rigidity region has rigidity locally lower than that of the high rigidity region in a direction orthogonal to a plate surface of the main flange.

2. The optical fiber winding reel according to claim 1, wherein
the low rigidity region is formed so as not to reach a position of an outer peripheral face of the main winding body.

3. The optical fiber winding reel according to claim 1, wherein
a width of the low rigidity region in the circumferential direction of the main flange is gradually smaller in a direction from an outer circumferential edge of the main flange toward a position of an outer peripheral face of the main winding body.

4. The optical fiber winding reel according to claim 1, wherein
the low rigidity region is formed in a range in the circumferential direction of the main flange, the range is located on a position of an outer-periphery of the main flange, the range includes both sides of the slit, the range is defined as an angle range with reference to a central axis line of the reel, and one-half of the range is in 30 degrees or less.

5. The optical fiber winding reel according to claim 1, wherein
the low rigidity region is formed by locally reducing a thickness of a portion of the main flange, which is located on the both sides of the position at which the slit is formed, so that the thickness thereof becomes thinner than that of the other portion.

6. The optical fiber winding reel according to claim 5, wherein
the thickness of the low rigidity region of the main flange gradually becomes smaller in a direction from the position close to the main winding body to a position of an outer circumferential edge of the main flange.

7. The optical fiber winding reel according to claim 5, wherein
the thickness of the low rigidity region of the main flange gradually becomes smaller in a direction from the position that is apart from the slit in an outer circumferential direction of the main flange to the position of the slit.

8. The optical fiber winding reel according to claim 5, wherein the main flange has a cutout portion serving as the low rigidity region, and the thickness of the cutout portion of the main flange is uniform.

9. The optical fiber winding reel according to claim 1, wherein in the case of seeing a slit-formed portion of the main flange in a direction from one side of the plate surface of the main flange along a direction parallel to a rotation center of the reel, the slit is formed so that one of edge portions that are located on both sides of the slit in the circumferential direction of the main flange does not overlap the other of the edge portions.

10. A reel-wound optical fiber wound around the main winding body of the optical fiber winding reel according to claim 1.

* * * * *